(12) United States Patent
Haugland

(10) Patent No.: US 7,327,145 B2
(45) Date of Patent: Feb. 5, 2008

(54) AZIMUTHALLY FOCUSED ELECTROMAGNETIC MEASUREMENT TOOL

(75) Inventor: S. Mark Haugland, Houston, TX (US)

(73) Assignee: PathFinder Energy Services, Inc., Houston, TX (US)

( * ) Notice: Subject to any disclaimer, the term of this patent is extended or adjusted under 35 U.S.C. 154(b) by 399 days.

(21) Appl. No.: 11/069,158

(22) Filed: Mar. 1, 2005

(65) Prior Publication Data

US 2005/0189947 A1 Sep. 1, 2005

Related U.S. Application Data

(60) Provisional application No. 60/548,928, filed on Mar. 1, 2004.

(51) Int. Cl.
*G01V 3/18* (2006.01)

(52) U.S. Cl. .................. 324/338; 324/356; 324/369; 73/152.43; 73/152.46

(58) Field of Classification Search ........ 324/338–339, 324/345–347, 355–356, 333, 366–369; 73/152.01, 73/152.43, 152.44, 152.45, 152.46
See application file for complete search history.

(56) References Cited

U.S. PATENT DOCUMENTS

| | | | |
|---|---|---|---|
| 4,468,623 A | 8/1984 | Gianzero et al. | |
| 4,949,045 A | 8/1990 | Clark et al. | |
| 4,972,150 A | 11/1990 | Tabbagh | |
| 5,045,795 A | 9/1991 | Gianzero et al. | |
| 5,138,263 A | 8/1992 | Towle | |
| 5,235,285 A | 8/1993 | Clark et al. | |
| 5,331,331 A | 7/1994 | Wu | |
| 5,491,488 A | 2/1996 | Wu | |
| 5,530,358 A | 6/1996 | Wisler et al. | |
| 5,867,806 A | 2/1999 | Strickland et al. | |
| 5,892,460 A | 4/1999 | Jerabek et al. | |
| 6,025,722 A | 2/2000 | Evans et al. | |
| 6,037,776 A | 3/2000 | McGlone | |
| 6,181,138 B1 | 1/2001 | Hagiwara et al. | |

(Continued)

FOREIGN PATENT DOCUMENTS

EP    0475715 A3    3/1992

(Continued)

OTHER PUBLICATIONS

Bonner, S., Bagersh, A., Clark, B., Dajee, G., Dennison, M., Hall, J.S., Jundt, J., Lovell, J., Rosthal, R., and Allen, D., "A new generation of electrode resistivity measurements for formation evaluation while drilling", SPWLA 35th Annual Logging Symposium, Jun. 19-22, 1994.

*Primary Examiner*—Bot LeDynh

(57) ABSTRACT

An azimuthally sensitive electromagnetic measurement tool is provided. The tool may be suitable, for example, to measure azimuthal variations of electrical properties of a subterranean formation. The tool includes a transmitter disposed to transmit electromagnetic energy into a subterranean formation and a longitudinally spaced receiver. At least one of the transmitter and the receiver includes a sector antenna. The sector antenna includes an exposed length of antenna wire that forms an arc about a portion of a circumference of the tool body. In one exemplary embodiment, the receiver includes first and second sector antennae, which, in combination, subtend a circular angle of about 360 degrees about the circumference of the tool body without substantially overlapping one another.

27 Claims, 10 Drawing Sheets

U.S. PATENT DOCUMENTS

| | | |
|---|---|---|
| 6,191,586 B1 | 2/2001 | Bittar |
| 6,211,678 B1 | 4/2001 | Hagiwara |
| 6,216,090 B1 | 4/2001 | Hagiwara |
| 6,218,842 B1 | 4/2001 | Bittar et al. |
| 6,297,639 B1 | 10/2001 | Clark et al. |
| 6,359,438 B1 | 3/2002 | Bittar |
| 6,377,050 B1 | 4/2002 | Chemali et al. |
| 2005/0168224 A1* | 8/2005 | Freeman et al. ............ 324/338 |

FOREIGN PATENT DOCUMENTS

| | | |
|---|---|---|
| GB | 2156527 A | 10/1985 |
| GB | 2268589 A | 12/1994 |
| GB | 2287324 A | 9/1995 |
| GB | 2297658 A | 8/1996 |
| GB | 2369890 A | 6/2002 |

* cited by examiner

AZIMUTHALLY FOCUSED ELECTROMAGNETIC MEASUREMENT TOOL

RELATED APPLICATIONS

This application claims the benefit of U.S. Provisional Application Ser. No. 60/548,928 entitled *Azimuthally Focused Electromagnetic Measurement Tool*, filed Mar. 1, 2004.

FIELD OF THE INVENTION

The present invention relates generally to downhole measurement tools utilized for measuring electromagnetic properties of a subterranean borehole. More particularly, embodiments of this invention relate to an azimuthally sensitive logging while drilling tool including a sectored antenna.

BACKGROUND OF THE INVENTION

Advances in directional drilling techniques enable the path of a subterranean borehole to be precisely routed in a manner that maximizes oil production. Measurement-while drilling (MWD) and logging-while-drilling (LWD) techniques provide, in substantially real-time, information about a subterranean formation as a borehole is drilled. Such information may be utilized in making steering decisions for subsequent drilling of the borehole. For example, an essentially horizontal section of a borehole may be routed through a thin oil bearing layer. Due to the dips and faults that may occur in the various layers that make up the strata, the drill bit may sporadically exit the thin oil-bearing layer and enter nonproductive zones during drilling. In attempting to steer the drill bit back into the oil-bearing layer, an operator typically needs to know in which direction to turn the drill bit (e.g., up, down, left, or right). In order to make correct steering decisions, information about the strata, such as the dip and strike angles of the boundaries of the oil-bearing layer, is generally required. Such information may be obtained from azimuthally sensitive measurements of electrical properties (e.g., resistivity and dielectric constant) of the surrounding subterranean formation.

Azimuthally sensitivity MWD/LWD resistivity tools are disclosed in the prior art. However, the precision demanded by directional drilling operations tends to require improved accuracy, increased angular resolution, and increased usability in all types of drilling fluids (also referred to herein as drilling mud). Areas of further potential improvement may include improved methods of tool manufacture, increased reliability, and/or lower cost than presently available with conventional resistivity tools. Therefore, there exists a need for improved azimuthally sensitive electromagnetic measurement tools suitable for LWD and/or directional drilling applications.

SUMMARY OF THE INVENTION

Aspects of the present invention are intended to address the above described need for improved azimuthally sensitive electromagnetic measurement tools for use in downhole applications. Referring briefly to the accompanying figures, aspects of this invention include a downhole tool (such as a logging while drilling tool) including at least one azimuthally sensitive transmitter and/or receiver. Such measurement tools may be advantageously utilized, for example, to acquire azimuthally sensitive measurements of certain electrical properties of a formation (such as resistivity and/or dielectric constant measurements). Exemplary embodiments of this invention may be advantageously utilized to make substantially simultaneous non-azimuthal (e.g., average) measurements of formation electrical properties. Moreover, certain embodiments of this invention may be particularly useful in providing images of the electrical properties of a formation. Such images may enable heterogeneities in the formation (e.g., caused by faults or boundaries) to be located with increased precision.

In one aspect the present invention includes a logging while drilling tool. The logging while drilling tool includes a tool body, a transmitter deployed on the tool body, the transmitter being disposed to transmit electromagnetic energy into a subterranean formation, and a receiver deployed on the tool body, the receiver being longitudinally spaced from the transmitter. At least one of the transmitter and the receiver include at least one sector antenna. The sector antenna includes an exposed length of antenna wire, the exposed length forming an arc about a portion of a circumference of the tool body.

In another aspect, this invention includes a logging while drilling tool. The logging while drilling tool includes a substantially cylindrical logging while drilling tool body, a transmitter deployed on the tool body, the transmitter being disposed to transmit substantially non azimuthally focused electromagnetic energy into a subterranean formation, and a receiver deployed on the tool body, the receiver being longitudinally spaced from the transmitter. The receiver includes first and second sector antennae. Each of the sector antennae includes an exposed length of antenna wire deployed in a circumferential recess formed in an outer surface of the tool body, with each of the exposed lengths forming a corresponding arc about a portion of a circumference of the tool body. The first and second sector antennae, in combination, subtend a circular angle of about 360 degrees about the circumference of the tool body without substantially overlapping one another.

In other aspects of this invention, methods for obtaining azimuthally sensitive measurements of the electrical properties of a subterranean formation are provided. In still other aspects of this invention, various embodiments of electrical circuits (e.g., receiver circuits) utilized in azimuthally sensitive transmitters and receivers are provided.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
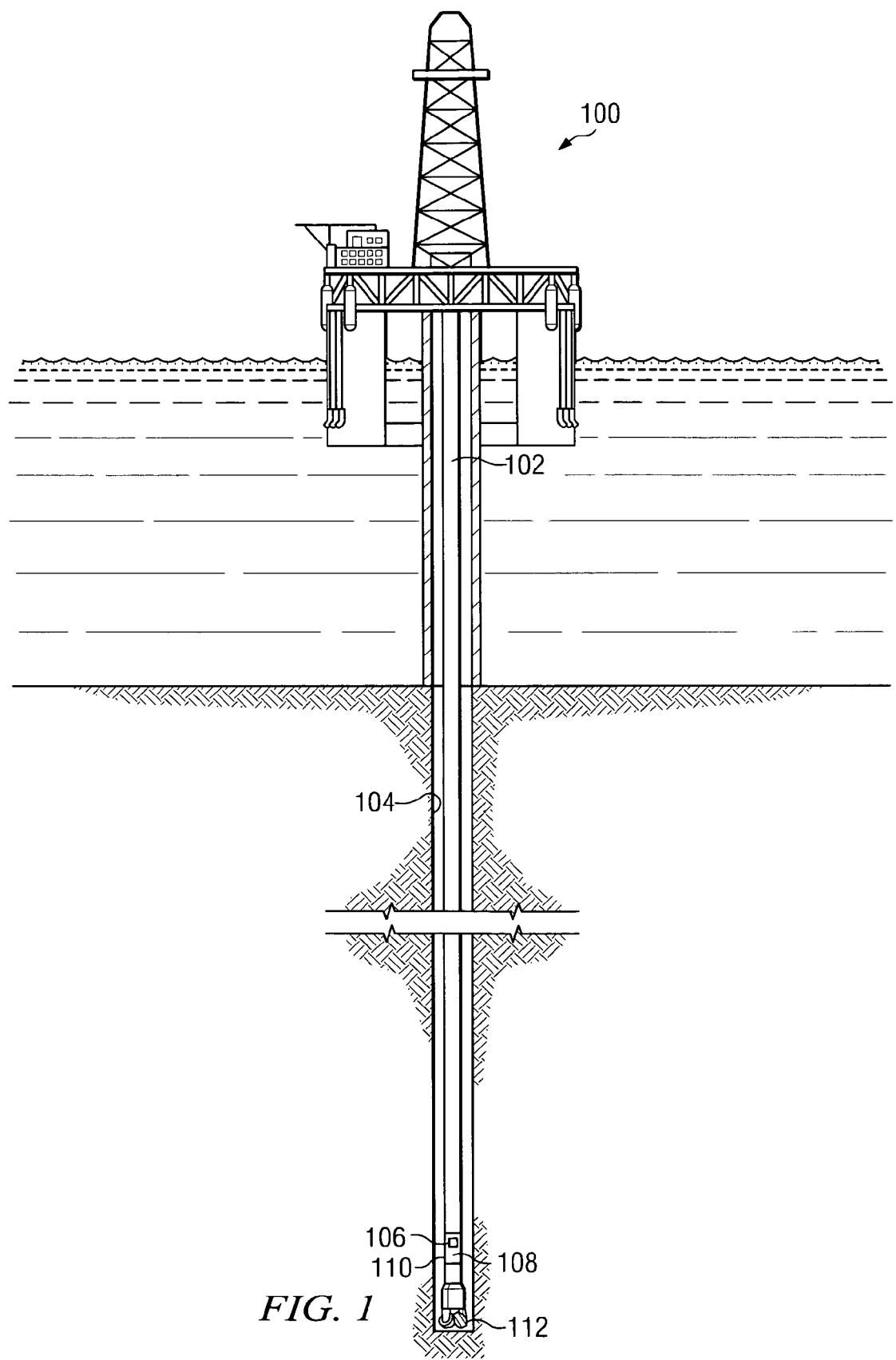
FIG. 1 illustrates a drilling rig on which exemplary embodiments of the present invention may be deployed.

FIG. 1 illustrates one exemplary embodiment of a measurement tool 110 according to this invention in use in an offshore oil or gas drilling rig, generally denoted 100. Drilling rig 100 includes a drill string 102, which, as shown, extends into borehole 104 and includes drill bit 112 and measurement tool 110. Measurement tool 110 includes an azimuthally sensitive resistivity measurement tool 108 and a direction sensor 106 (e.g., a gravity sensor). Azimuthally sensitive measurement tool 108 advantageously provides azimuthal measurements indicative of certain electrical properties (such as resistivity and dielectric constant) of portions of the surrounding formation.

It will be understood by those of ordinary skill in the art that the measurement tool 110 of the present invention is not limited to use with an offshore drilling rig 100 as illustrated in FIG. 1. Measurement tool 110 is equally well suited for use with any kind of subterranean drilling operation, either offshore or onshore.

According to various exemplary embodiments of this invention, azimuthally sensitive values for a resistivity and/or dielectric constant of a formation may be determined by: (1) deploying an azimuthally sensitive measurement tool (e.g., measurement tool 110 on FIG. 1) in a borehole (e.g., borehole 104 on FIG. 1); (2) transmitting an electromagnetic pulse into the borehole; (3) receiving the pulse at at least one longitudinally spaced receiver; (4) determining the attenuation and/or phase shift of the received pulse; and (5) deriving an estimate of certain electrical properties (such as the resistivity and/or dielectric constant) of the portion of the formation under investigation, based on the attenuation and/or phase shift measurements. Methods are known in the art for determining values for the resistivity and dielectric constant of a formation based on measurements of attenuation and/or phase shift. Serviceable interrogation frequencies of the transmitted electromagnetic wave are typically in the range from about 0.4 MHz to about 2 MHz, although this invention is not limited to any particular range of interrogation frequencies. Preferably, multiple frequencies are employed to yield greater amounts of information. Higher frequencies are known to be influenced by the dielectric properties of a formation while lower frequencies are known to penetrate deeper into a formation.

With further reference to FIG. 1, azimuthally sensitive measurement tool 110 is typically azimuthally focused in one or more directions perpendicular to the longitudinal axis thereof to obtain azimuthal measurements that pertain to portions of the formation in the associated azimuthal directions. Each azimuthally sensitive measurement may be associated with a directional vector obtained concurrently by an azimuth sensor 106 (e.g., including one or more gravity sensors). In addition, measurement tool 110 may include a depth sensor to provide a depth value that may be associated with each measurement.

Measurement tool 110 may further include a controller (not shown) having, for example, a programmable processor (not shown), such as a microprocessor or a microcontroller, and may also include processor-readable or computer-readable program code embodying logic, including instructions for controlling the function of the measurement tool 110. A suitable processor may be utilized, for example, to construct images of the subterranean formation based on the azimuthally sensitive measurements and the associated directional vector and depth information. Images of the earth formation may indicate electrical properties of the surrounding formation and/or the materials comprising the strata.

A suitable controller may also optionally include other controllable components, such as sensors, data storage devices, power supplies, timers, and the like. The controller may also be disposed to be in electronic communication with various sensors and/or probes for monitoring physical parameters of the borehole, such as a gamma ray sensor, a depth detection sensor, or an accelerometer, gyro or magnetometer to detect azimuth and inclination. A controller may also optionally communicate with other instruments in the drill string, such as telemetry systems that communicate with the surface. A controller may further optionally include volatile or non-volatile memory or a data storage device.

A suitable controller typically also includes conventional electronics utilized in transmitting and/or receiving an electromagnetic waveform. For example, the controller may include conventional electronics such as a variable gain amplifier for amplifying a relatively weak return signal (as compared to the transmitted signal) and/or various filters (e.g., low, high, and/or band pass filters), rectifiers, multiplexers, and other circuit components for processing the return signal. Various exemplary controller embodiments are described in more detail below with respect to FIGS. 4A through 5B.

Figure 2A:
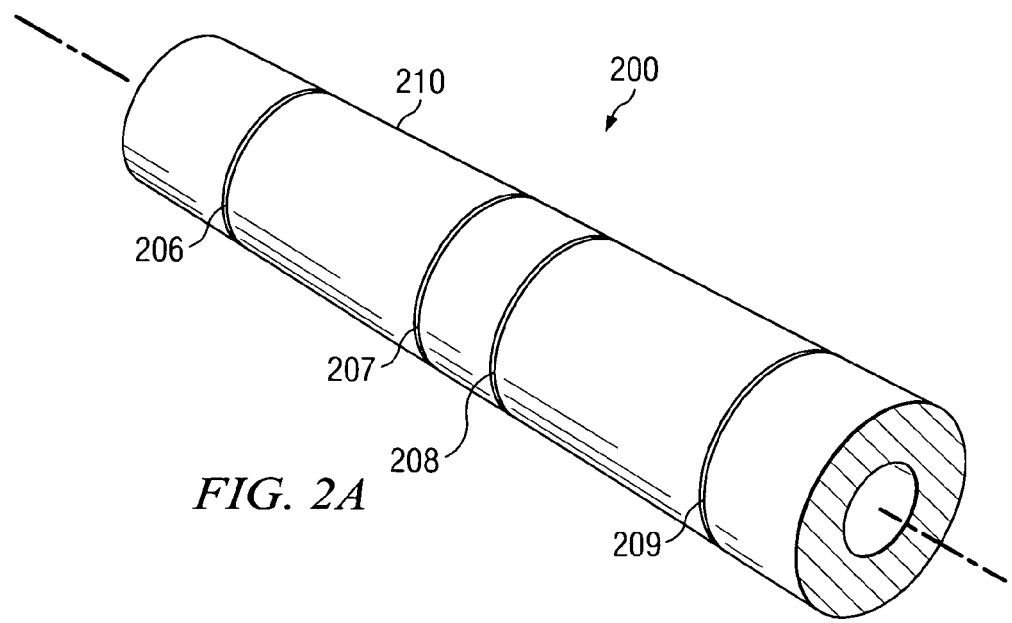
FIG. 2A depicts one exemplary embodiment of an azimuthally focused measurement tool according to this invention.

With reference now to FIG. 2A, one embodiment of an azimuthally sensitive measurement tool 200 is shown. Measurement tool 200 is an example of the measurement tool 110 described with respect to in FIG. 1 and includes a plurality of transmitters 206, 209 and receivers 207, 208 deployed on a cylindrical housing 210 (also referred to as drill collar 210). Drill collar 210 is typically fabricated from an electrically conductive, non-magnetic material such as stainless steel and is configured for coupling with a drill string (e.g., drill string 102 in FIG. 1). In the exemplary embodiment shown in FIG. 2, two longitudinally spaced transmitters 206 and 209 are deployed on the cylindrical housing 210 and are configured to selectively radiate an electromagnetic wave into a borehole. A differential pair of longitudinally spaced receivers 207 and 208 are longitudinally spaced from the transmitters 206, 209 and are configured to measure the attenuation and/or phase shift of certain interrogation frequency components of a transmitted electromagnetic pulse. Typically, the measurements obtained represent the average of measurements obtained over a duration of the pulse (a typical pulse being in the range of from about 10 to 300 milliseconds). In the embodiment shown, the pair of receivers 207, 208 is centered between the two transmitters 206, 209. However, the invention is not limited by the longitudinal position or spacing of the transmitters and receivers or by the number of transmitters and receivers.

Exemplary embodiments of this invention include at least one azimuthally focused transmitter and/or receiver. A conventional non-azimuthally focused transmitter radiates electromagnetic energy with substantially azimuthally symmetrical intensity about the tool. In contrast, an azimuthally focused transmitter radiates electromagnetic energy with an increased intensity on one or more sides of the tool (the associated azimuthal directions) as compared to other sides of the tool. Non-azimuthally focused receivers do not distinguish an azimuthal direction of a received field, but rather provide a signal that is essentially an average of the field on all sides of the tool. In contrast, an azimuthally focused receiver has an increased sensitivity on one or more sides of the tool (the associated azimuthal directions) as compared to other sides of the tool.

With continued reference to FIG. 2A, various exemplary embodiments of the invention comprise a measurement tool 200 including a transmitter and receiver 206-209 arrangement that typically conform to one of the following three configurations: (1) the receivers 207, 208 and at least one of the transmitters 206, 209 are azimuthally focused in at least one azimuthal direction; (2) the receivers 207, 208 are azimuthally focused in at least one azimuthal direction and the transmitters 206, 209 are not azimuthally focused; and (3) at least one of the transmitters is azimuthally focused and the receivers 207, 208 are not azimuthally focused. Measurement tools configured according to (1) may be referred to as symmetrical when the transmitters 206, 209 and receivers 207, 208 are azimuthally focused in the same one or more directions. Such symmetrical configurations tend to increase signal to noise by emitting and receiving the electromagnetic radiation on the same side of the tool. However, such configurations also tend to be sensitive to tool rotation speed, with variations in the rotation speed potentially effecting repeatability. Measurement tools configured according to (2) and (3) may be referred to as nonsymmetrical. Such nonsymmetrical tools tend to be substantially unaffected by tool rotation and thus may provide for improved repeatability.

Figure 2B:
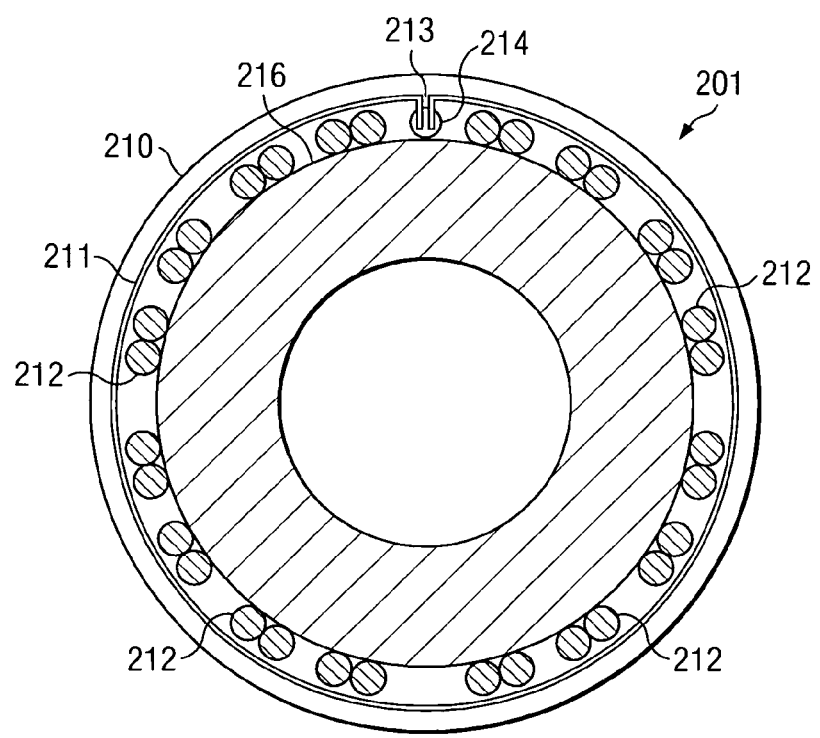
FIG. 2B depicts a conventional non-azimuthally focused antenna of the prior art.

With reference now to FIG. 2B, a conventional non-azimuthally focused antenna 201 suitable to be utilized as either a receiver or transmitter is shown in circular cross-section. Antenna 201 includes an elongated conductive wire 211 that is deployed in an annular recess 216 of a drill collar 210. The wire 211 may be wound one or more revolutions about the drill collar 210 (FIG. 2B shows a configuration with a single winding). The wire 211 may further be hermetically sealed within the recess to protect it from the external environment, but is nonetheless configured to either radiate or receive an electromagnetic wave to or from the external environment. The ends of the wire 211 form first and second terminals 213, 214 that may be electrically coupled to a receiver/transmitter circuit (e.g., one of the receiver circuits shown on FIGS. 4A through 4C). Embodiments of antenna 201 that function as a receiver may respond to an electromagnetic wave by generating a pick-up signal in the form of a voltage differential across the first and second terminals 213, 214 that is indicative of various attributes of the wave, such as the relative amplitude and phase thereof. Embodiments of antenna 201 that function as a transmitter are deployed to radiate an electromagnetic wave in response to an excitation signal in the form of an alternating current received from a transmitter circuit.

Antenna 201 further includes a ring-shaped area having a perimeter defined by the inner cylindrical surface of recess 216 and outer concentric circle of the exposed wire 211. The pick-up signal or excitation signal tends to be proportional to the total magnetic flux within the associated area. Ferrous material 212 may be deployed within the ring-shaped area to advantageously increase such magnetic flux.

With reference now to FIGS. 2C through 2H, various exemplary embodiments are shown of azimuthally focused antennae 202-205 suitable for use as an azimuthally focused receiver and/or transmitter in symmetrical or non-symmetrical embodiments of measurement tool 200 (FIG. 2A). Azimuthally focused antennae 202-205 include at least one sector antenna 220A-P including one or more electrically conductive antenna wires 221A-P. Each antenna wire 221A-P includes at least one exposed portion 223 (223A and 223B in FIG. 2C) deployed to either transmit or receive electromagnetic energy to or from the external environment. Exposed wire portions 223, in the disclosed embodiments, are located within an annular recess 216 of the drill collar 210 and may be hermetically sealed from the external environment in a manner that allows electromagnetic energy to be received or transmitted but protects the exposed wire portions 223 from extreme conditions commonly encountered in down hole environments. Also, as described above with respect to the prior art device shown on FIG. 2B, antennae 202-205 may include ferrous material 212 deployed in recess 216 to increase magnetic flux. Each antenna wire 221A-P may further include one or more shielded portions 222 that are substantially shielded from electromagnetic radiation, and which may function primarily as transmission lines. Antenna wires 221A-P may include one or more windings as described above with respect to antenna 201 shown on FIG. 2B.

Suitable exposed wire portions 223 may, for example, form an arc, coaxial with the drill collar 210, having an a subtended circular angle in the range from about 15 to about 345 degrees, although the invention is not limited in this regard. Smaller angles tend to yield better azimuthal resolution. Azimuthal resolution refers to the smallest angle for which a change in the measured electrical properties of the surrounding formation is detectable. Certain embodiments of antennae 202-205 disclosed herein (FIGS. 2C, 2D, 2E, and 2G) include at least one sector antenna 220A-P, having a subtended circular angle of less than or equal to about 120 degrees. It will be appreciated that wire portions 223 may also be deployed in non-arc shaped configurations (e.g., straight line). Arc shaped configurations, however, tend to be advantageous in that they provide closer correlation with conventional (non-azimuthal) tools and thus may provide better accuracy when combining a plurality of azimuthal measurements to derive a non-azimuthal measurement.

The subtended circular angle of sector antenna 220A-P is typically determined based on a number of design and application tradeoffs. For example, as stated above, smaller angles generally provide better azimuthal resolution. However, smaller angles also tend to reduce signal strength (both received and transmitted) and therefore tend to reduce signal to noise. Other factors that may influence the optimum subtended circular angle include drill collar shielding effects related, for example, to tool and borehole diameters, as well as the formation and drilling fluid properties such as formation resistivity, dielectric constant, and absorption coefficients. Selection of an optimum subtended circular angle may also depend upon the requirements of a particular application. Nevertheless, as stated above, preferred embodiments typically include at least one sector antenna having a subtended circular angle less than or equal to about 120 degrees.

As described above, sector antennae 220A-P may be deployed as a receiver and/or a transmitter depending upon the associated electronics. Sector antennae 220A-P deployed as receivers (e.g., receivers 207, 208 in FIG. 2A) are responsive to an electromagnetic wave and thus generate a pick up signal, generally in the form of a voltage differential, across matched node pairs 224, 225. The induced pick up signal (voltage) may indicate, for example, the relative amplitude and phase of the received electromagnetic wave. In antennae including multiple windings, the pick up signals for each winding may be electrically coupled in series to generate a combined pickup signal and thereby increase signal to noise. Sector antennae 220A-P deployed as transmitters (e.g., transmitters 206, 209 in FIG. 2A) may be deployed to receive an excitation signal, e.g., in the form of an alternating current, at matched node pairs 224, 225. Exposed wire portions 223 are responsive to the excitation signal to radiate an azimuthally focused electromagnetic wave. It will be appreciated that matched node pairs may be coupled to a transmitter circuit (not shown) and thereby polarized in substantially any suitable manner. The invention is not limited in this regard.

Figure 2C:
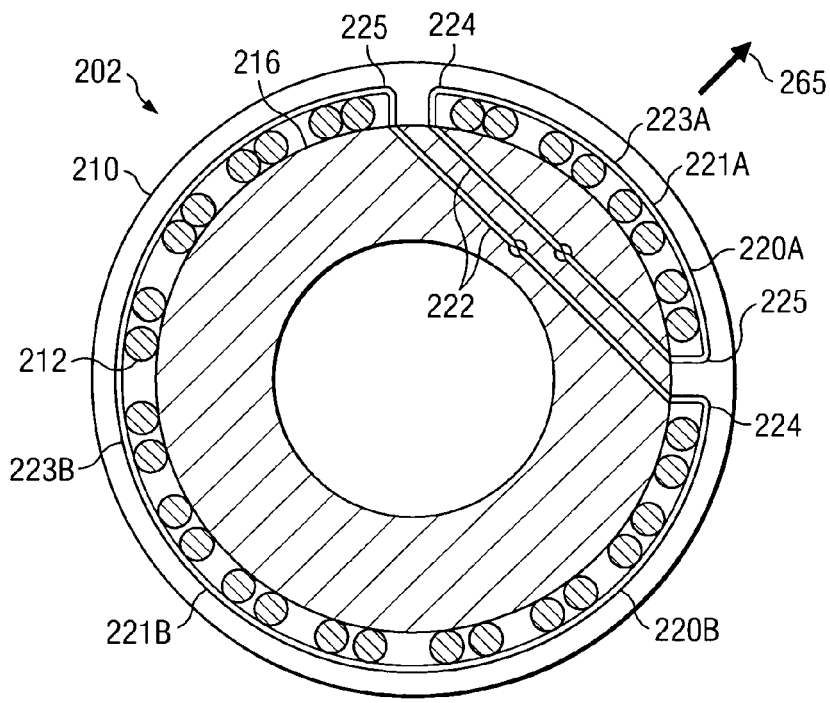
FIGS. 2C through 2H depict various exemplary embodiments of azimuthally focused antennae of the present invention.
Figure 2D:
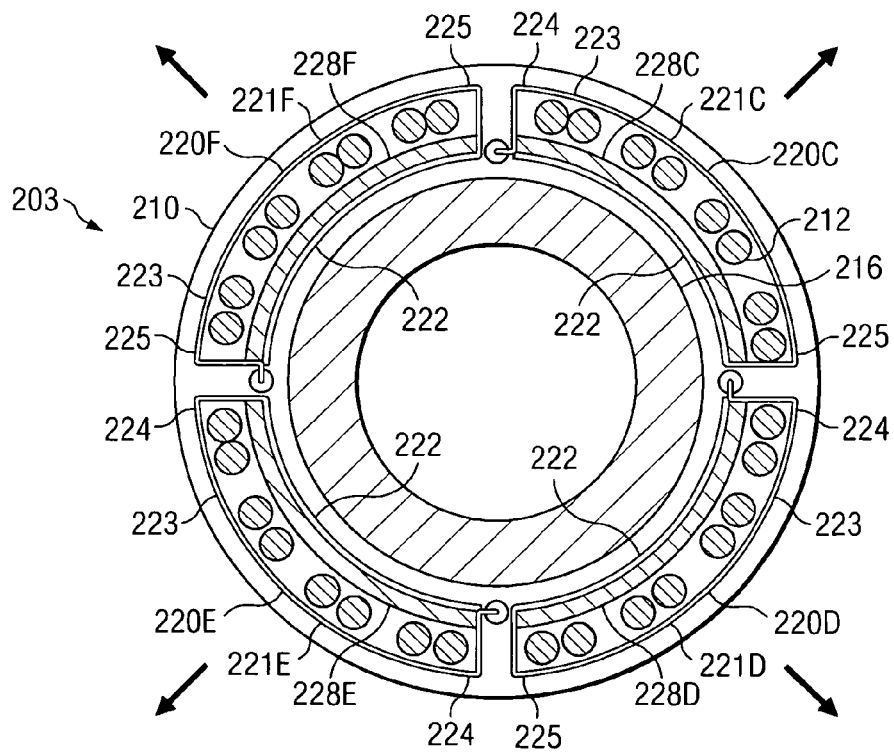
Figure 2E:
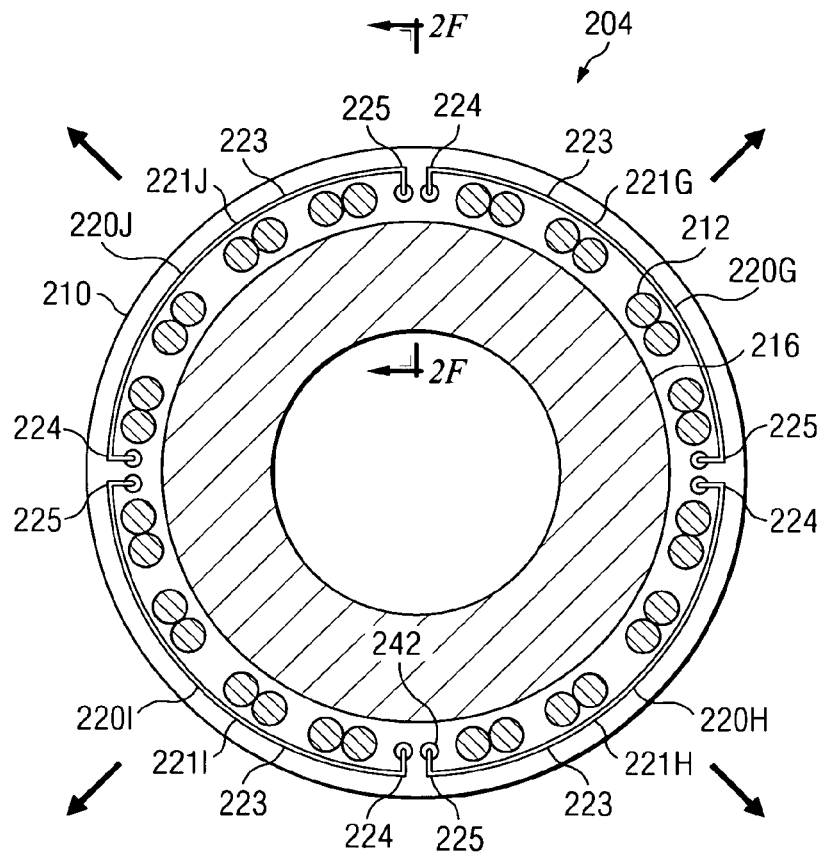
Figure 2F:
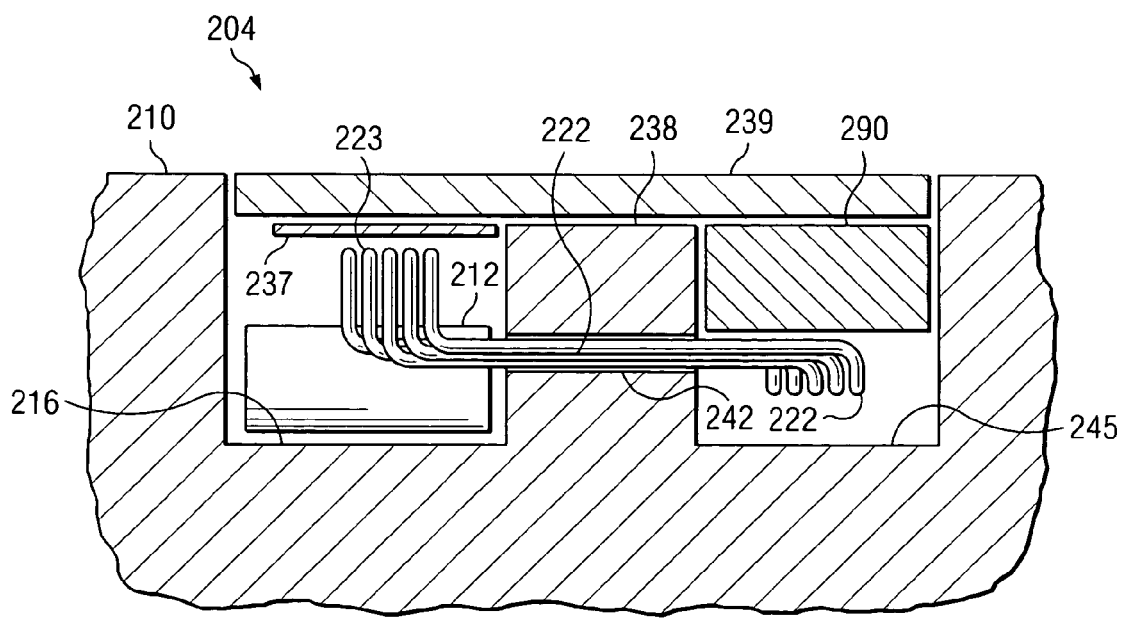
Figure 2G:
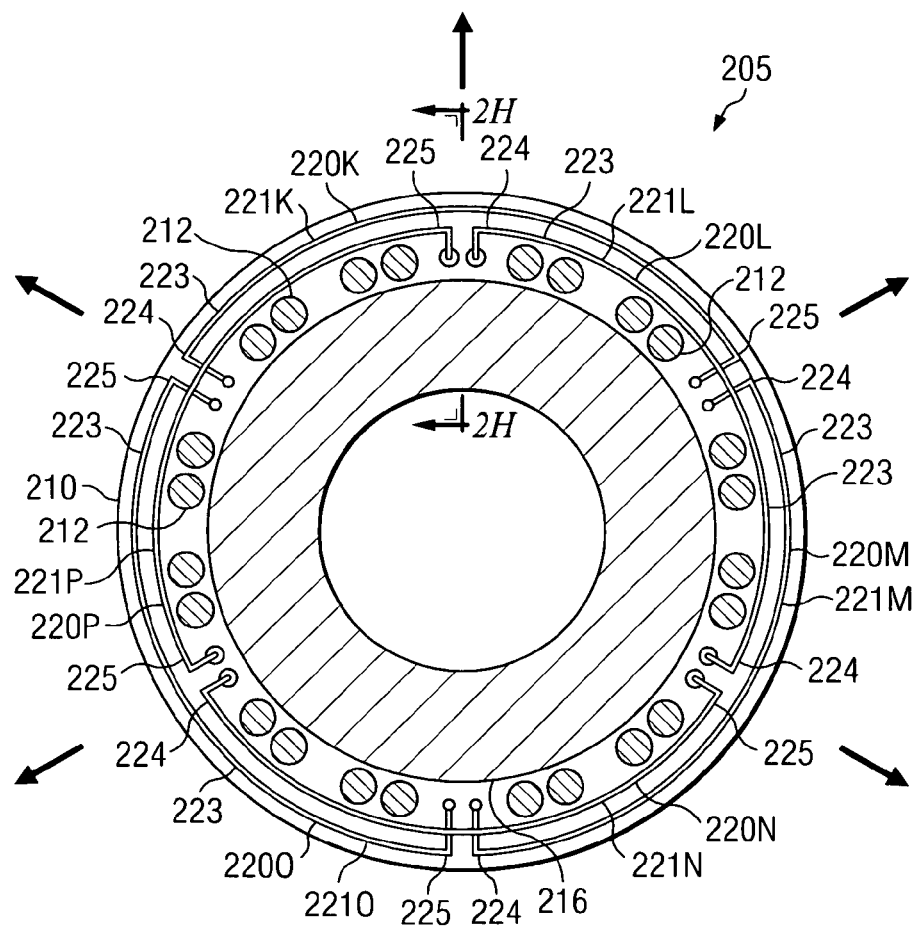
Figure 2H:
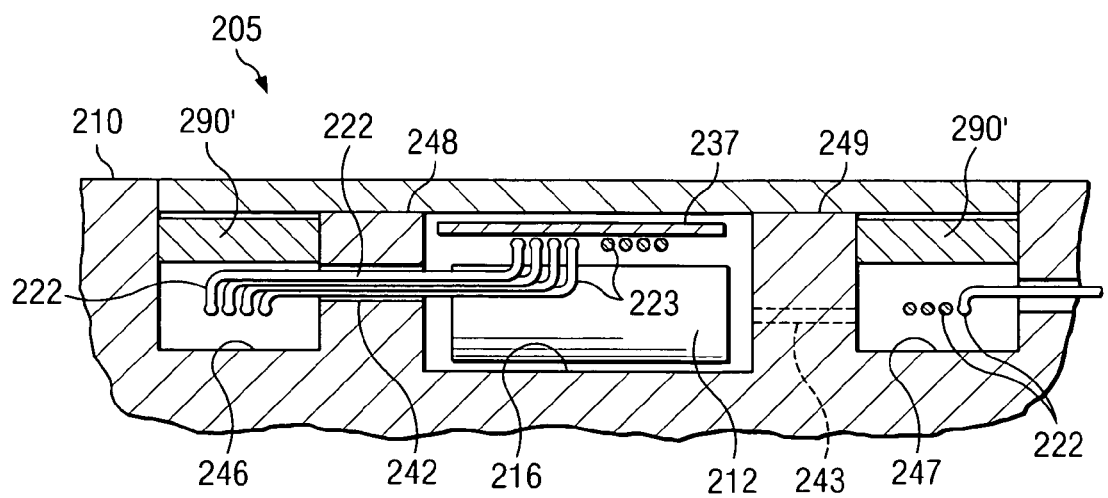

With reference now to FIGS. 2F and 2H, exemplary embodiments of azimuthally focused antennae 204 and 205 according to this invention may further include a shield portion 237 deployed between exposed wires 221G-P and the borehole (not shown). Shield portion 237 serves to reduce capacitance effects between the antennae 204 and 205 and the drilling fluid. In one exemplary embodiment, the shield portion 237 is fabricated in the form of a cylindrical sleeve from a thin copper sheet (e.g., having a thickness in the range from about 1 to about 3 millimeters) and further includes a plurality of spaced radial slots (not shown). The spacing and size of the slots are typically selected to allow predetermined frequency components to propagate through the shield portion 237. Shield portion 237 may alternatively be fabricated in the form of a cylindrical tube that encircles the exposed wires 221G-P. In such alternative embodiments, the shield portion typically includes one or more radial slots (or gaps) sized and positioned to allow propagation of preferred frequency components. Shield portion 237 is typically electrically grounded to mitigate against electrical interference with the measured and/or generated fields. The shield portion 237 may also function to reduce (or even substantially eliminate) electrostatic effects common to configurations in which an azimuthally focused transmitter and a corresponding azimuthally focused receiver do not have the same shape.

With reference again to FIGS. 2C through 2H, it will be appreciated that antennae 202-205 may also be utilized for making non-azimuthal measurements. For example, the pickup signals for sector antennae 220A and 220B (shown in FIG. 2C) may be added (e.g., connected in series) or averaged to determine average (i.e., non-azimuthal) electrical properties of a formation. A plurality of sector antennae (such as sector antennae 220A and 220B) is referred to as complementary when the sum of their exposed portions 223 subtend an angle of approximately 360 circular degrees without overlapping. It will also be appreciated that an alternative embodiment of antennae 202-205 may include a single sector antenna, such as sector antenna 220A. Such an alternative embodiment may also be utilized to acquire non-azimuthal measurements, for example, by averaging a pickup signal from the single sector antenna (e.g., sector antenna 220A) as the tool completes one full rotation (360 degrees).

With continued reference to FIGS. 2C through 2H various alternative embodiments are described in more detail. In FIG. 2C, one exemplary embodiment of an azimuthally focused antenna 202 is illustrated. Azimuthally focused antenna 202 is configured to provide both azimuthally focused and non-azimuthally focused measurements. Antenna 202 includes first and second sector antennae 220A and 220B. Sector antenna 220A provides increased sensitivity (focus) in a radial direction generally ranging from about node 224 to about 225 (as shown by arrow 265). It will be appreciated that the subtended circular angle of the azimuthal sensitivity may vary depending upon numerous factors including, for example, various formation and borehole properties, and the longitudinal distance between the transmitter and receiver. Nevertheless, antenna 220A typically provides increased sensitivity in the direction 265 indicated. During use, azimuthally focused antenna 202 is typically deployed in a measurement tool coupled to a rotating drill string. The azimuthal measurements may thus be utilized to provide images of electrical properties of the surrounding formation.

In the embodiment shown in FIG. 2C, sector antennae 220A, 220B include corresponding antenna wires 221A, 221B having exposed portions 223A, 223B deployed between shielded portions 222. Exposed portion 223A subtends an angle of about 90 degrees while exposed portion 223B subtends an angle of about 270 degrees. The antenna wires 221A, 221B are typically fabricated from highly conductive materials, such copper or beryllium copper alloys, although the invention is not limited in this regard. The shielded portions 222 are substantially shielded from electromagnetic radiation by the thick metal of the steel drill collar 210.

Turning now to FIG. 2D, another exemplary embodiment of an azimuthally focused antenna 203 is illustrated. Azimuthally focused antenna 203 includes four ten-turn sector antennae 220C-F. Each sector antenna spans an angle of about 90 degrees to provide azimuthally focused measurements pertaining to each of four quadrants surrounding the measurement tool (e.g., measurement tool 200 in FIG. 2A). The ability to obtain simultaneous measurements pertaining to each of the four quadrants offers the advantage of full 360 degree imaging while the tool is sliding and not rotating. The four ten-turn sector antennae 220C-F are arranged in a complementary relationship to provide for four azimuthally focused measurements that may be combined to estimate a non-azimuthally focused measurement as described above.

Exemplary embodiment 203 illustrates an exemplary deployment for routing the exposed portions 223 of the ten-turn antenna wires 221C-F in series by utilizing shield plates 228C-F. Each sector antenna 220C-F includes an antenna wire 221C-F that comprises nine shielded portions 222 interposed between ten exposed portions 223. Each group of ten exposed wire portions 223 are electrically coupled together in series via respective shielded portions 222 that electrically couple a first node 224 of one exposed wire portion 223 to a node 225 of another exposed wire portion 223. Four electrically conductive non-magnetic shield plates 228C-F are located between the ferrous material 212 and the surface of the recess 216 to provide a channel for each of the shield portions 222 interconnecting two exposed portions 223. Suitable shield plates 228C-F substantially shield the shielded portions 222 from electromagnetic radiation. In one exemplary embodiment shield plates 228C-F are fabricated from an electrically conductive, non-magnetic steel having a thickness of about 3/16 of an inch. The shield plates 228C-F may further be electrically coupled to the drill collar 210, which, in certain embodiments, functions as an electrical ground.

The use of shield plates 228-C-F may be advantageous in that each shield plate 228C-F may be constructed as a separate sub-assembly, which tends to lower manufacturing and maintenance costs. The sub-assemblies may include an antenna wire 221C-F, ferrous material 212, and a shield plate 228C-F. Shielded portions 222 located at the ends of each antenna wire 221C-F may function as the positive and negative terminals that are electrically coupled to the respective receiver/transmitter circuit. The shielded portions 222 may be contiguous with the exposed portions 223, which advantageously minimizes variation in the electrical characteristics of the individual antenna wires 221C-F.

Turning now to FIGS. 2E and 2F, still another exemplary embodiment of an azimuthally focused antenna 204 is illustrated. Azimuthally focused antenna 204 is similar to azimuthally focused antenna 203 on FIG. 2D in that it includes four multi-turn sector antennae 220G-J, each of which subtends a circular angle of about 90 degrees. Antenna 204 on FIGS. 2E and 2F provides for an increased number of turns. Shielded portions 222 are not routed in the same plane in which exposed portions 223 reside. Instead shielded portions 222 are routed through a channel that is longitudinally spaced from the exposed portions 223 (as shown in FIG. 2F which depicts section 2F of FIG. 2E). As described above, antenna 204 further includes an insulating sleeve 239 (FIG. 2F) that protects antenna wires 221G-J from extreme conditions commonly encountered down hole.

In the embodiment shown, sector antennae 220G-J each include a contiguous antenna wire 221G-J having multiple arc-shaped exposed portions 223 interposed between shielded portions 222. The exposed portions 223 are aligned within a first annular recess 216 in the drill collar and are disposed to receive or transmit electromagnetic radiation. The exposed portions 223 are electrically coupled in series through respective shield portions 222. The positive and negative terminals of each antenna wire 221C-J are electrically coupled through respective shield portions 222 to receiver/transmitter circuitry (not shown).

With continued reference to FIGS. 2E and 2F, antenna 204 includes a second annular recess 245 longitudinally spaced from annular recess 216. The second annular recess 245 provides a path for the shielded portions 222. Routing the shielded portions in this manner advantageously preserves space for the exposed portions 223. As shown in FIG. 2F, annular recess 245 may be covered with an electrically grounded, electrically conductive, non-magnetic cap 290 that provides substantial shielding from electromagnetic radiation. Further, multiple channels 242 may extend substantially longitudinally through an annular wall 238 positioned between the adjacent annular recesses 216, 245 to provide a path for shielded portions 222. Each channel 242 is located approximately coincident with one of the ends 224, 225 of the arc-shaped exposed portions 223.

Turning now to FIGS. 2G and 2H, yet another exemplary embodiment of an azimuthally focused antenna 205 is illustrated. Azimuthally focused antenna 205 includes six equiangular, overlapping sector antennae 220K-P. Each sector antenna 220K-P includes multiple exposed portions 223 that are each arc-shaped and subtend a circular angle of about 120 degrees. The six sector antennae 220K-P may be thought of as being deployed in two groups of three antennae each. The three antennae in each group (the first group including sector antennae 220K, 220M, 220O and the second group including sector antennae 220L, 220N, 220P) are in a complementary arrangement as shown. In the embodiment shown, the first group of sector antennae is longitudinally offset from the second group of sector antennae (as shown in FIG. 2H). The first group of sector antennae is also rotationally offset from the second group of sector antennae by about 60 degrees about the longitudinal axis of the tool. As such, azimuthally focused antenna 205 provides azimuthally sensitive measurements at about 60 degree intervals about the circumference of the tool.

Each sector antenna 220K-P includes an antenna wire 221K-P having multiple exposed wire portions 223 interposed between shielded portions 222. The ends of each antenna wire 221K-P correspond respectively to the positive and negative terminal of antenna wire 221K-P. Exposed portions 223 may be electrically coupled in series through shielded portions 222, which are selectively routed through one of two adjacent, axially spaced, annular recesses 246, 247 (FIG. 2H). Embodiment 205 is similar to embodiment 204 (shown in FIGS. 2E and 2F) in that the shielded portions 222 are routed through longitudinally spaced recesses 246, 247. Analogous to embodiment 204, annular recesses 246, 247 on embodiment 205 are each covered with a grounded electrically conductive non-magnetic cap 290' that provides substantial shielding from electromagnetic radiation. Two intermediary annular walls 248, 249 serve to shield recesses 246, 247 from recess 216. As also described above with respect to FIGS. 2E and 2F, channels 242, 243 may extend through walls 248, 249 between the adjacent recesses 216, 246 and 216, 247. Paths from each of the adjacent recesses 246, 247 to a respective one of the receiver/transmitter circuits may be provided by channels 242, 243 in the drill collar 210.

Figure 6A:
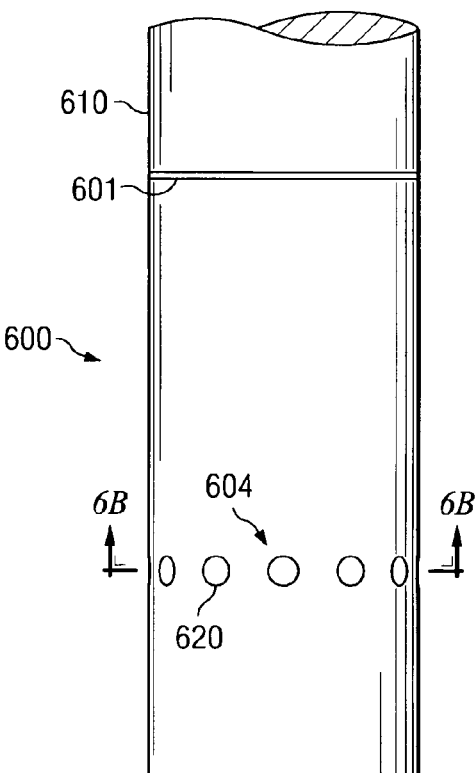
FIGS. 6B and 6B depict a further alternative embodiment of an azimuthally focused measurement tool according to the present invention.
Figure 6B:
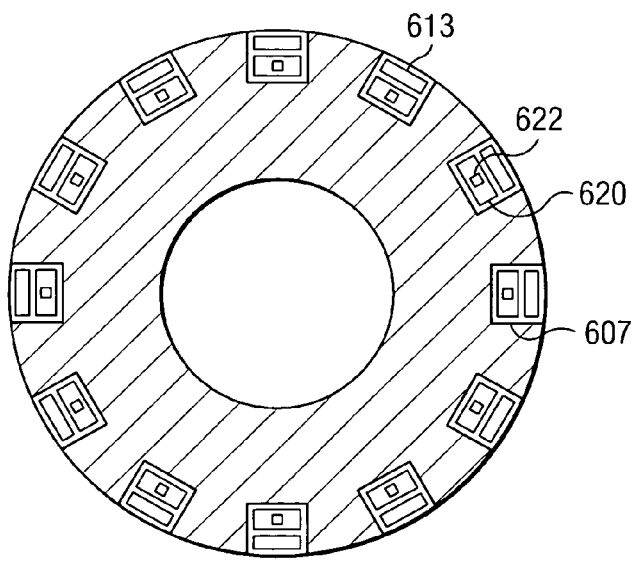

With reference now to FIGS. 6A and 6B, further alternative embodiments of this invention are described. FIGS. 6A and 6B depict a measurement tool 600 suitable for azimuthally sensitive electromagnetic measurements. Measurement tool 600 includes a tool body 610, e.g., a portion of a drill collar, configured for coupling with other segments of a drill string (e.g., drill string 102 shown on FIG. 1). Measurement tool 600 further includes at least one transmitter 601 disposed to radiate an electromagnetic wave (having one or more interrogation frequencies) into a formation of interest. It will be appreciated that transmitter 601 may be either azimuthally focused (e.g., analogous to one of transmitter/receivers 202, 203, 204, and 205 described above with respect to FIGS. 2C through 2H) or non-azimuthally focused (e.g., analogous to transmitter/receiver 201 described above with respect to FIG. 2B). In the exemplary embodiment shown on FIG. 6A, transmitter 601 is non-azimuthally focused. A suitable transmitter 601 typically includes a loop antenna having one or more loops that may be energized by an alternating current to propagate an electromagnetic wave into the surrounding formation. As described above with respect to FIGS. 2A through 2H, typical interrogation frequency components in exemplary embodiments are often selected to be in the range from about 0.4 to about 2 Mhz.

Measurement tool 600 further comprises an azimuthally sensitive receiver 604 longitudinally spaced from transmitter 601. Receiver 604 includes a plurality of magnetic field sensors 620 deployed, for example, about the periphery of the tool body. A typical receiver 604 may include, for example, six or more magnetic field sensors 620 deployed circumferentially about the measurement tool, although the invention is not limited in this regard. Sensors 620 may include substantially any suitable magnetic field sensors, such as magnetometers, magneto resistance sensors, giant magneto resistance (GMR) sensors, and anisotropic magneto resistance (AMR) sensors. Each sensor 620 preferably includes three mutually orthogonal magnetic field sensors (although the invention is not limited in this regard), one of which has a known orientation relative to the longitudinal axis of the tool 600 for resolving the magnetic field into a magnetic field vector (having magnitude and direction components). Individual sensors 620 tend to be more sensitive to magnetic field variations that are in close proximity to the sensor (e.g., on the same side of the tool) and thus may provide for azimuthally sensitive measurements (e.g., a sensor deployed on the high side of the tool is likely to be more sensitive to local magnetic fields or magnetic field variations on the high side of the borehole than to magnetic fields located elsewhere). The plurality of sensors 620 is intended to detect, for example, azimuthal variations in the magnetic field. It will be appreciated that the measured field from two or more sensors may be combined to provide for measurements having varying azimuthal sensitivity or even non-azimuthal measurements.

The exemplary embodiment shown on FIGS. 6A and 6B includes twelve magnetic field sensors 620 having an equidistant spacing about the circumference of tool 600. The plurality of sensors 620 typically (although not necessarily) defines a plane orthogonal to the longitudinal axis of the tool 600. In preferred embodiments, each sensor 620 may include a triaxial GMR or AMR sensor 622 deployed in a suitable bore 607 in the exterior surface of the tool body 610, although the invention is expressly not limited in this regard. Further, in the exemplary embodiment shown, an insulative material 613 provides a protective cover for each sensor 620.

Circuits employing GMR/AMR sensors 622 are preferably balanced to minimize corruption of the pick-up signals from electrostatic effects. For example GMR circuits may be configured in Wheatstone bridge or half-Wheatstone bridge configurations to provide a pick-up signal (indicating the magnetic field) in the form of a voltage differential across corresponding first and second matched node pair. Three GMR/AMR sensors 622 may be arranged in one package to obtain three scalar measurements of the magnetic field in distinct orthogonal directions. Optionally, the GMR sensors 622 may be selected to provide a pick-up signal having a frequency that is twice that of the interrogation frequency. Advantageously, in such an embodiment, noise in the pick-up signal attributable to cross-coupling between the transmitter and receiver circuits may be more easily filtered. Preferred embodiments of magnetic field sensors 620 may be packaged to operate under the extreme conditions commonly encountered downhole (e.g., extreme temperatures, pressures, vibrations, shocks, corrosive fluids, etc.). For example, the GMR/AMR monolith circuit may be embedded within a thin layer of sapphire or other suitable material.

It will be appreciated that while FIG. 6A shows a measurement tool 100 including a single receiver 604 (i.e., a plurality of sensors deployed in a common plane), various alternative embodiments of this invention may include two or more receivers 604 (two or more pluralities of sensors deployed in corresponding common planes). For example, in one alternative embodiment, a measurement tool may include two longitudinally spaced receivers 604. The individual sensors 620 on the respective receivers 604 may be, for example, circumferentially aligned (i.e., having substantially equal azimuthal positions on the tool). Such a tool may be configured to provide differential azimuthal measurements of the magnetic field, which may include attenuation and phase shift information. In another alternative embodiment, a measurement tool may include four longitudinally spaced receivers 604. Such a "quad" configuration may provide for improved determination of attenuation and phase shift information and may be used in combination with known deconvolution and image enhancement techniques to effectively construct images of the subterranean formation based on the azimuthally sensitive measurements.

In other alternative embodiments, measurement tool 600 may include a second transmitter (not shown). In such configurations, the one or more receivers 604 are typically deployed between the transmitters along the longitudinal axis of the tool. In other alternative embodiments the one or more transmitters 601 may be tilted with respect to the longitudinal axis of the tool 600, for example at an angle of 30 degrees, to propagate a nonuniform (azimuthally focused) magnetic field into the formation.

Methods for Utilizing Azimuthal Measurement Tools

A consideration for measurement tools including azimuthally focused antennae (e.g., antennae 202-205 described above with respect to FIGS. 2C through 2H) configured as transmitters is the requirement to distinguish which of the transmitter sector antenna is the source of an electromagnetic wave received by a receiver. Such distinguishing is typically required to assign a directional vector to a received waveform. This issue may be particularly pronounced in embodiments in which the number of sector antennae is high (e.g., antenna 205 shown on FIGS. 2G and 2H). Exemplary methods of this invention include selectively exciting each of the sector antenna such that the interrogation frequency, relative phase, and/or time intervals, are predefined so that one or more receivers (e.g., receivers 207 and 208 shown on FIG. 2A) may distinguish the source of the radiation. For example, sector antennae 220K-P in antenna 205 may be excited sequentially by a central control circuit (not shown), so that time may be used to track the source of each emission. Alternatively, two or more sector antennae may be excited to radiate during the same time interval, but with different frequencies, to allow a central control circuit to distinguish the source of the electromagnetic wave. In another exemplary embodiment, two or more sector antennae may be configured to radiate electromagnetic energy during the same time intervals with the same interrogation frequency, but at different phases (e.g., out of phase with one another by about 180 degrees).

Figure 3A:
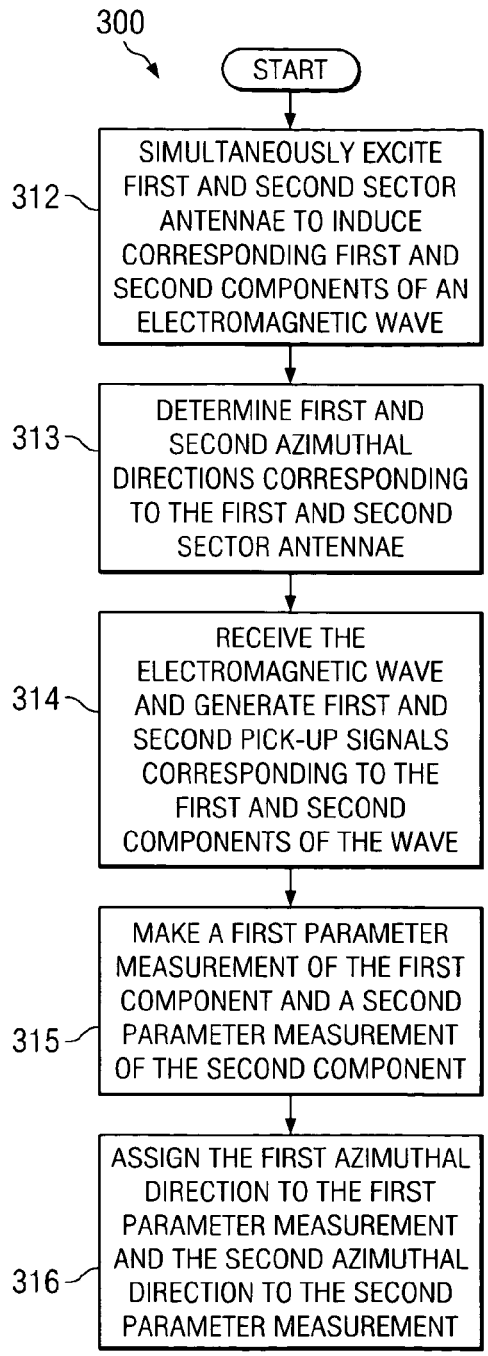
FIGS. 3A through 3C depict flow diagrams of exemplary methods embodying this invention.

FIG. 3A depicts a flow diagram of an exemplary method embodiment 300 of the present invention for simultaneously obtaining two azimuthal measurements of one or more properties of the surrounding formation (such as resistivity or dielectric constant). Method 300 typically, although not necessarily, utilizes a tool including a transmitter having at least two sector antennae (as described above) and a longitudinally spaced receiver (or pair of receivers, for example as shown on FIG. 2A). The tool also typically includes an azimuth sensor (e.g., sensor 106 in FIG. 1) and a controller configured to execute the method 300. In FIG. 3A, step 312 includes simultaneously exciting first and second sector antennae (having distinct azimuths) to induce corresponding first and second components of an electromagnetic wave. The first and second components may be made distinguishable, for example, by having distinguishably different frequencies. Step 313 includes determining first and second azimuthal directions corresponding to the first and second sector antennae. Step 314 includes receiving the electromagnetic wave, for example with a pair of axially spaced receivers, and generating first and second electric pick-up signals corresponding to the first and second components of the wave. Step 315 includes making a first parameter measurement of the first component of the electromagnetic wave and a second parameter measurement of the second component of the electromagnetic wave. The parameters may be, for example, attenuation and phase shift as the electromagnetic wave passes between a pair of receivers. A filter may be utilized to separate the first and second components from each of the first and second pick-up signals generated by each of the receivers. Step 316 includes assigning the first azimuthal direction to the first parameter measurement and the second azimuthal direction to the second parameter measurement.

Embodiments of an azimuthally sensitive imaging apparatus may also include a timer for tracking time and the central controller may be adapted to initiate and control predefined measurement cycles having sequential time intervals (e.g., 20 milliseconds). During each time interval a different one of the plurality of sector antennae (for example antennae 220K-P shown on FIG. 2G) may be excited. In addition, the measurement cycle may further include a longer time interval (e.g., 130 milliseconds) in which all transmitters in one group are excited to obtain a non-azimuthal measurement. Optionally, two transmitter sector antennae may be excited in the same time interval using different interrogation frequencies or phases. Additional azimuthal information may be obtained by simultaneously exciting two transmitter sector antennae that have overlapping angles (e.g., from among sector antennae 220K-P). Alternatively, a first sector antenna may be selected to radiate with a first phase and two other sector antennae that overlap the first sector antenna may be selected to radiate with a different phase to yield two distinguishable azimuthal measurements, one having greater azimuthal resolution than the other. For example, sector antennae 220K, 220L, 220M shown on FIG. 2G may be excited simultaneously, with the center sector antenna 220L radiating at a first phase and the two adjacent antennae 220K, 220M radiating at a second phase.

Figure 3B:
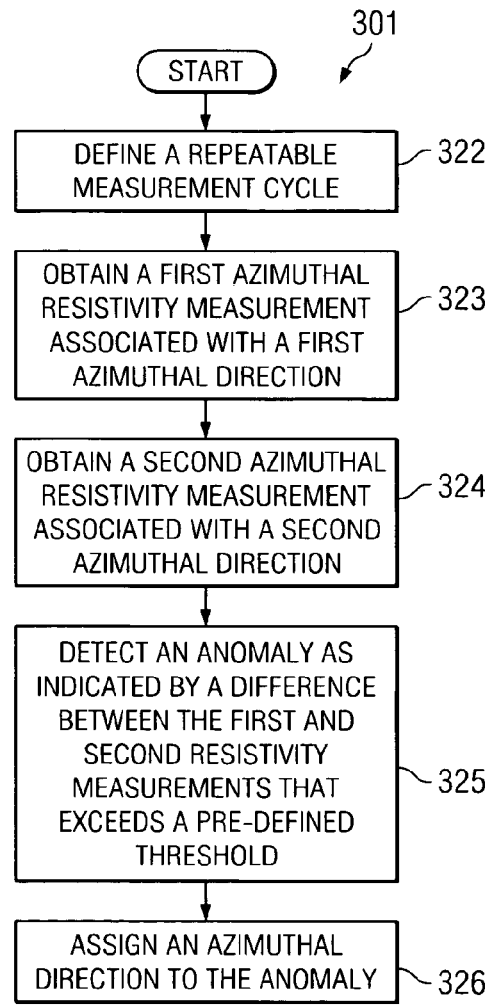

FIG. 3B depicts a flow diagram of a method 301 that provides for determining the azimuthal direction of an anomaly in a subterranean formation. In this exemplary method embodiment, the tool typically includes a transmitter and/or the receiver having at least one sector antenna. Step 322 in FIG. 3B includes defining a repeatable measurement cycle including first and second non-overlapping time intervals having predefined relative time relationships. Step 323 includes obtaining, during the first time interval, a first azimuthal resistivity measurement that is associated with a first azimuthal direction. Step 324 involves obtaining, during the second time interval, a second azimuthal resistivity measurement that is associated with a second azimuthal direction. Step 325 includes detecting an anomaly in the strata as indicated by a difference between the first and second azimuthal resistivity measurements that exceeds a predefined threshold. Step 326 involves assigning an azimuthal direction to the anomaly based on the first and second azimuthal directions.

Method 301 may be utilized, for example, to assist a drilling operator to steer a drill bit in a pay zone. This may be accomplished, for example, by detecting the azimuthal direction(s) of bed boundaries in the strata or by detecting the azimuthal direction(s) of dips and divergences in a bed boundary penetrated by the drill bit. Method 301 may be further refined for use with an azimuthally sensitive imaging apparatus that includes a tool having at least one transmitter or a receiver pair that includes a large number of small angled sector antennae (for example six sector antennae that each subtend a circular arc of about 60 degrees around the circumference of a cylindrical tool). Step 322 may further include grouping a plurality of adjacent sector antennae to obtain an azimuthal measurement that is a combination of the measurements obtained by the individual sector antenna. Such combining of measurements is discussed later in this disclosure with respect to FIGS. 4A through 4E. Steps 323 and 324 may further include, respectively, selecting a first group and a second group to obtain the measurements. In this manner, the advantage of higher azimuthal resolution obtained by using small angled sector antennae is preserved, while gaining the advantages of a strong pick-up signal associated with a wide angled sector antenna.

Figure 3C:
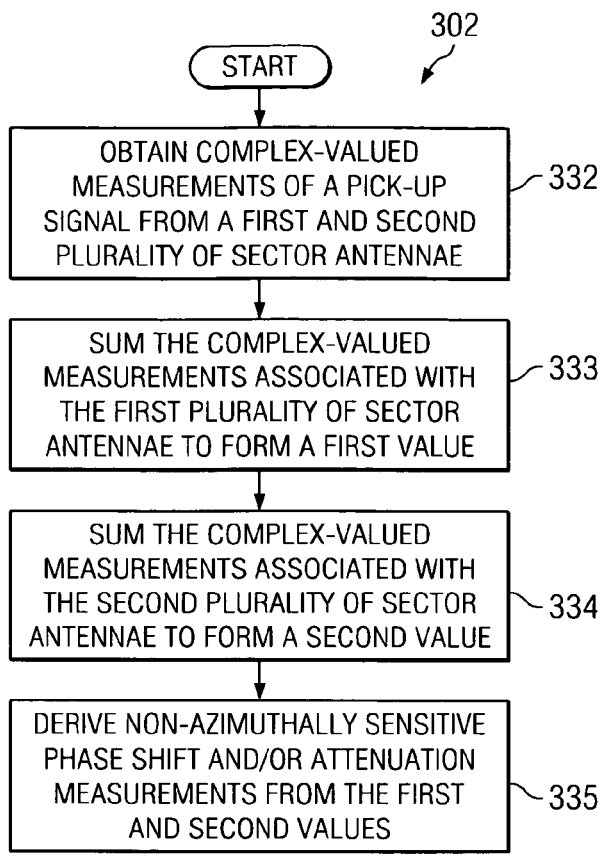

FIG. 3C depicts an exemplary method embodiment 302 for obtaining a non-azimuthally sensitive measurement based on measurements obtained by a matched receiver pair that each include a plurality of sector antennae arranged in a complementary relationship. Step 332 of method 302 includes representing measured pick-up signals in the form of complex values. Such complex values represent one or more parameters, such as relative amplitude and phase, of a received electromagnetic wave by the first and second plurality of sector antennae. Step 333 includes summing each of the complex valued measurements associated with each one of the first plurality of sector antennae to form a first voltage value. Step 334 includes summing each of the complex-valued pick-up signals associated with each one of the second plurality of sector antennae to form a second voltage value. Step 335 includes deriving a non-azimuthally sensitive phase shift and/or attenuation measurement based on the ratio of the first and second voltage values.

In steps 333 and 334 the mathematical summing may be accomplished, for example, by processor deployed down hole or at the surface. Alternatively the voltages may be summed directly in the hardware, for example, by a summing amplifier as described in more detail below in conjunction with FIGS. 4A through 4E. The following equations represent the standard non-azimuthally sensitive phase shift $\Phi_T$ (in degrees) and attenuation $A_T$ (in decibels) measurements.

$$\Phi_T = \frac{180}{\pi} \arg\left(\frac{\sum_{i=1}^{n} V_{1i}}{\sum_{i=1}^{n} V_{2i}}\right) \quad (1)$$

$$A_T = 20 \log\left|\frac{\sum_{i=1}^{n} V_{1i}}{\sum_{i=1}^{n} V_{2i}}\right| \text{ dB} \quad (2)$$

where $V_{1i}$, i=1 to n, represent the complex-valued pick-up signal measurements across n sectors (i.e. across the associated first and second nodes 224, 225 on FIGS. 2C through 2H) comprising the first plurality of sector antennae and $V_{2i}$, i=1 to n, represent the complex-valued pick up signal measurements across n sectors (i.e. across the associated first and second nodes) comprising the second plurality of sector antennae.

The principle underlying equations (1) and (2) is the basic definition of voltage between two points:

$$V = -\int_{P_1}^{P_2} \overline{E} \cdot d\overline{l} \qquad (3)$$

where $\overline{E}$ is the electric field; where $P_1$ and $P_2$ are the two points between which V is determined, such as the nodes of each pickup signal, or alternatively for multiple turn antenna, $P_1$ and $P_2$ may represent the ends (e.g. positive and negative terminals) of each antenna wire; and where $d\overline{l}$ is a differential displacement vector along a curve connecting $P_1$ and $P_2$. Thus, the voltage across a series connection of coil segments is the sum of the voltages across the individual segments.

Sector Antenna Circuits

Cross-coupling tends to be a consideration for any antenna deployment. Cross-coupling between adjacent sector antennae may be particularly pronounced for receiver antenna having overlapping sector antennae (e.g., antenna 205 on FIGS. 2G and 2H). Cross-coupling may occur, for example, when an alternating electrical current is generated in a receiver sector antenna in response to receiving an electromagnetic wave. This alternating current can induce a secondary electromagnetic field that combines with the field generated by a transmitter, resulting in an error in the measurements obtained by any another receiver in close proximity. In embodiments in which the error due to cross-coupling is consistent, a suitable method for compensating for the error may include, for example, measuring the magnitude of the error for each interrogation frequency, storing the error information, and adjusting each measurement obtained based on the stored error information. Alternatively, sector antenna may be connected with a switch that may be selectively opened and closed to isolate the antenna. Respective sector antenna may be selectively deactivated and activated by opening and closing corresponding switches. Exemplary circuits including such switches are disclosed in FIGS. 4A through 4C.

Figure 4A:
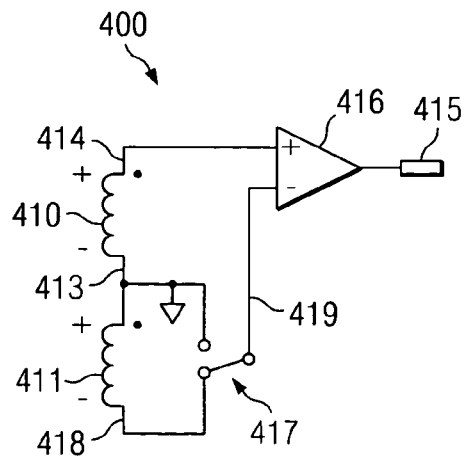
FIGS. 4A through 4E depict exemplary circuit diagrams useful for interconnecting a plurality of sector antennae according to embodiments of the invention.
Figure 4B:
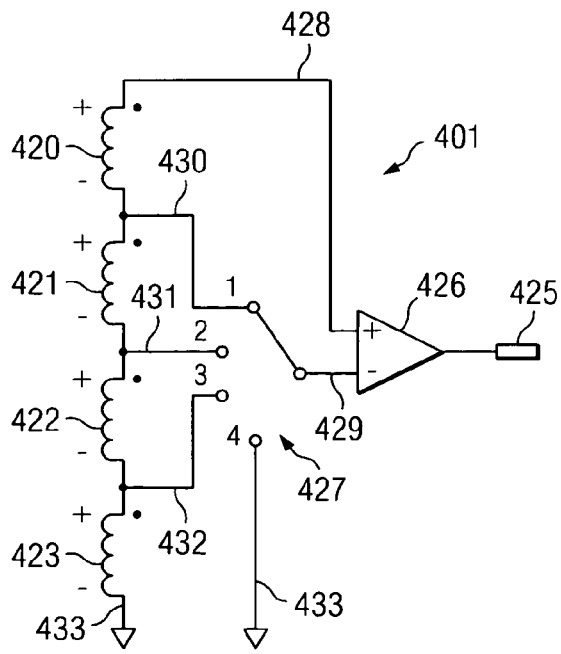
Figure 4C:
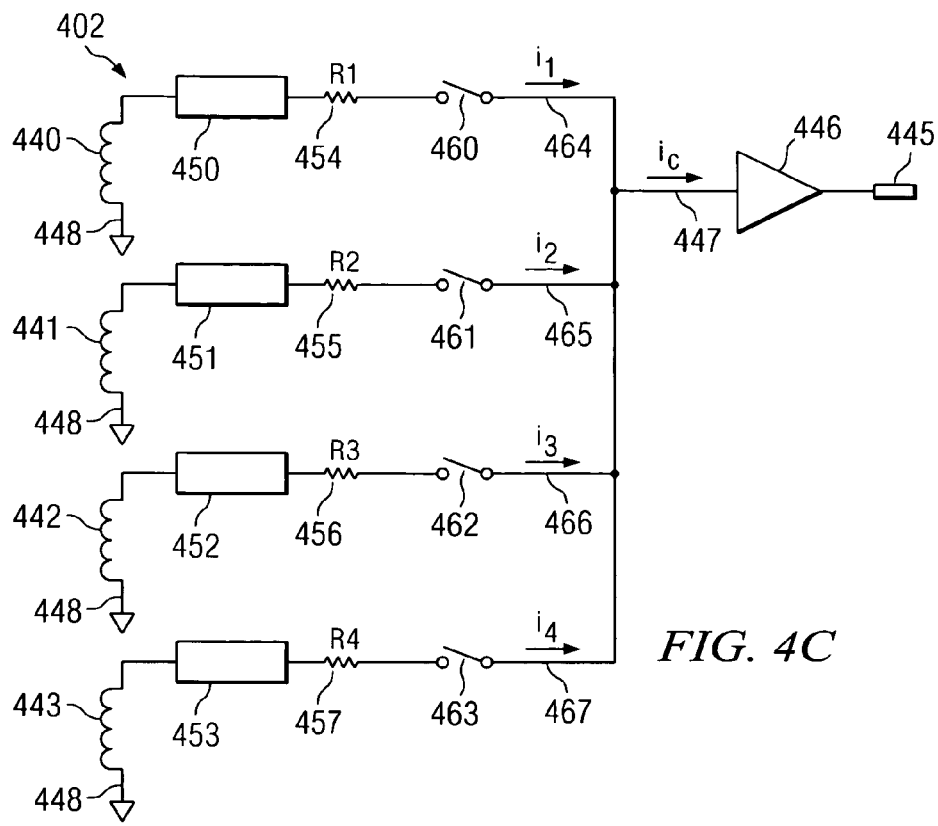

Embodiments of a receiver circuit may include a preamplifier that is advantageously located in close proximity with the receiver antenna to minimize the effects of loading and to obtain flexibility in the implementation of the frequency response of the receiver antenna. It is conventional for a preamplifier circuit to receive a pick-up signal from an antenna and generate an amplified version of the pick-up signal on an output. However, as the number of sector antennae is increased, it becomes more difficult to provide a separate preamplifier circuit for each sector antenna. FIGS. 4A, 4B, and 4C illustrate circuits embodiments that advantageously minimize the number of preamplifier circuits and the number of output pick-up signals that need to be coupled over a large distance, e.g., 4 to 8 foot, while providing for a large number of sector antennae.

With reference now to FIG. 4A a schematic diagram of one exemplary embodiment of a circuit 400 is shown. Circuit 400 is configured for interconnecting two sector antennae 410, 411 arranged in a complementary relationship to a preamplifier circuit 416. Circuit 400 is particularly useful for interconnecting receiver antennae including two sector antennae, such as antenna 202, shown on FIG. 2C, which includes sector antennae 220A and 220B. Circuit 400 enables a central controller (not shown) to alternatively select either the first or both of the two sector antennae 410, 411 to generate a pick-up signal indicative of the amplitude and/or phase of select frequency components of a received electromagnetic wave. When the first sector antenna 410 is selected, the pick-up signal provides azimuthally sensitive measurements of one or more properties of the surrounding formation and when both sector antennae 410, 411 are selected, the pick-up signal provides a non-azimuthal measurement of one or more properties of the surrounding formation.

It will be appreciated that circuit elements 410 and 411 represent first and second sector antenna. Nodes 414 and 413 are electrically connected to the positive and negative terminals of the first sector antenna 410 and nodes 413 and 418 are electrically connected to the positive and negative terminals of the second sector antenna 411. A preamplifier 416 has a positive input that is electrically coupled to node 414 and a negative input that is electrically coupled to the common node 419 of a two-position switch 417. Preamplifier 416 generates on output 415 an amplified version of the pick-up signal received across the positive and negative inputs 414, 419. Two-position switch 417 may be controlled by a central controller (not shown) to selectively couple node 419 to either node 413 or node 418. When node 419 is connected to node 413, the pick-up signal across the positive and negative terminals of antenna 410 is received by the positive and negative input to the preamplifier. In such a configuration, an azimuthal measurement is made with antenna 410 (since antenna 411 is disconnected). When node 419 is connected to node 418, antenna 410 and antenna 411 are connected in series and a combined pick-up signal (the sum of the respective pickup signals generated by both antennae 410, 411) is received. In such a configuration, a non-azimuthal measurement is made using both antennae 410 and 411 in combination.

Turning now to FIG. 4B, a schematic diagram illustrates one exemplary embodiment of a circuit 401 configured for interconnecting four sector antennae 420-423. Circuit 401 may be particularly useful for interconnecting receiver antennae including four sector antennae, such as antenna 203, shown in FIG. 2D (which comprises four sector antennae 220C-F that are arranged in a complementary relationship). Circuit 401 enables a central controller (not shown) to alternatively select one, two, three, or four of the sector antennae 420-423 to generate a pick-up signal indicative of the amplitude and/or phase of selected frequency components of a received electromagnetic wave. Circuit 401 provides for both azimuthally sensitive measurements and a non-azimuthal measurement of one or more properties of the surrounding formation.

Four sector antennae 420-423 are electrically connected in series. The series combination is connected on one end to node 428, which is the positive input of a preamplifier circuit 426, and on the other end to node 433, which in this embodiment functions as electrical ground. Node 430 is electrically coupled to the negative terminal of antenna 420 and the positive terminal of antenna 421. Node 431 is electrically coupled to the negative terminal of antenna 421 and the positive terminal of antenna 422. Node 432 is electrically coupled to the negative terminal of antenna 422 and the positive terminal of antenna 423. A four-position switch 427 is disposed to connect one of the nodes 430-433 to the negative input of the preamplifier 426. Switch 427 is typically controlled via an electronic controller (not shown).

With continued reference to FIG. 4B, a measurement sequence including multiple time intervals may be utilized to make non-azimuthal and azimuthal measurements in each of the radial directions corresponding to the azimuthal antennae 420-423. For example, each of the first three time intervals may be 10 ms and the third measurement may be 50 ms. During the first three intervals one of the switch positions 1 through 3 are selected and during the fourth cycle switch position 4 is selected. During each time interval, a measurement value is obtained of the amplitude and/or phase of the pick-up signal generated on the output 425 of preamplifier 426. When switch 427 is in position 1, node 430 is connected to node 429 such that the preamplifier receives the pick-up signal from antenna 420. Such a configuration is azimuthally sensitive in the azimuthal direction associated with antenna 420. When switch 427 is in position 2, node 431 is connected to node 429 such that preamplifier 426 receives the combined pick-up signal from antennae 420 and 421. Measurements made with switch 427 in position 1 may be subtracted from measurements made with switch 427 in position 2 to obtain azimuthal sensitivity in the azimuthal direction associated with antenna 421. When switch 427 is in position 3, node 432 is connected to node 429 such that preamplifier 426 receives the combined pick-up signal from antennae 420-422. Measurements made with switch 427 in position 2 may be subtracted from measurements made with switch 427 in position 3 to obtain azimuthal sensitivity in the azimuthal direction associated with antenna 422. When switch 427 is in position 4, node 433 is connected to node 429 such that preamplifier 426 receives the combined pick-up signal from antennae 420-423, which is essentially a non-azimuthal measurement. Measurements made with switch 427 in position 3 may be subtracted from measurements made with switch 427 in position 4 to obtain azimuthal sensitivity in the azimuthal direction associated with antenna 423.

A single pick-up signal generated by the output of the preamplifier 426 may provide a plurality of azimuthal and non-azimuthal measurements by selectively activating one or a combination of sector antennae 420-423 interconnected to a preamplifier 426 through a multiple position switch 427. Alternative embodiments of circuit 401 have a larger number of sector antennae interconnected through a version of switch 427 that includes more than four positions. Furthermore, circuit 401 may be employed multiple times, for example twice, once for each of two complementary antennae, such as antenna 205 shown in FIGS. 2G and 2H.

With reference now to FIG. 4C a schematic of another exemplary embodiment of a circuit 402 for interconnecting a preamplifier circuit 446 to four sector antennae 440-443 is shown. Sector antennae 440-443 are each electrically coupled in series, respectively, to a tuning network 450-453, a resistor R1-R4 454-457, and a switch 460-463 forming four sub-circuits 464-467. Each sub-circuit 464-467 is coupled on one end to electrical ground 448 and on the other end to the input of a 447 of preamplifier 446. Tuning networks 450-453 cooperate with the respective antennae 440-443 to achieve a predetermined frequency response to received electromagnetic radiation. The impedance of a tuning network 450-453 and a respective antennae 440-443 in combination provide for a strong pick-up signal for frequency components of interest while diminishing the magnitude of the pick-up signal for other frequencies (i.e. out-of-band frequencies). Tuning networks 450-453, in one exemplary embodiment, are each shown as being in series with a respective antenna 440-443. However, in other embodiments a plurality of parallel combinations may be utilized, including a tuning network coupled in parallel with one of the antenna 440-443, with each parallel combination being in series with a respective resistor R1-R4 454-457 and switch 460-463.

Switches 460-463 are individually controllable, such as by a central controller (not shown), to select between closed and open states. The load seen by each antenna 440-443, when the corresponding switch 460-463 is in a closed state, is determined by the corresponding tuning network 450-453 and resistor R1-R4 454-457. The current through each sub-circuit 464-467 is, respectively, referred to as $i_1$, $i_2$, $i_3$, and $i_4$. The current $i_1$, $i_2$, $i_3$, $i_4$ through each sub-circuit 464-467 is proportional to the pick-up signal, which is in the form of a voltage differential across the respective antenna 440-443. The current $i_c$, at any point in time, is the sum of the currents $i_1$, $i_2$, $i_3$, $i_4$ through each sub-circuit 464-467. Preamplifier 446 receives a pick-up signal on input 447 in the form of a current $i_c$ and generates an amplified version of the received pick-up signal on output 445, which, preferably, but not essentially, is in the form of a voltage differential. The voltage at node 447 remains essential constant regardless of the state of the switches 460-463 and magnitude of the currents $i_c$, $i_1$, $i_2$, $i_3$, $i_4$. Methods for implementing current to voltage amplifier circuits suitable for preamplifier 446 are well known by those skilled in the art.

A central controller (not shown) may be electrically coupled to each switch 460-463 to determine the source of a measurement by selecting the state of each switch 460-463. For example, a predefined measurement cycle may comprise a sequence of time intervals, such as 10 milliseconds, in which during each time interval, one of the switches 460-463 is selected to be closed while the other switches are open. During each time interval, an azimuthally sensitive measurement is obtained from the sector antennae 440-443 in which the corresponding switch 460-463 is closed. The predefined measurement cycle may further include a time interval in which all switches are closed, to obtain a measurement that is essentially a sum of the individual azimuthally sensitive measurement from each of the antenna 440-443. For antennae 440-443 that are arranged in a complementary relationship, the sum provides a suitable estimate of a non-azimuthally sensitive measurement. For increased accuracy in identifying the material comprising the portion of the formation under investigation, the time interval of inquiry may be increased from 10 milliseconds up to, for example, 160 milliseconds.

It will be appreciated that circuit 402 may be configured to interconnect with substantially any number of antennae. For example, an alternative embodiment of circuit 402 may include one sub-circuit corresponding to each of twelve sector antennae deployed about a tool circumference, each subtending a circular angle of about 30 degrees. As described above, a central controller may select one sector antenna to obtain an azimuthally sensitive measurement by selecting the corresponding switch to be closed while the other switches are open. Such measurements tend to have the azimuthal resolution associated with the individually selected antenna. Alternatively, measurements may be made at two or more adjacent sector antennae by opening and closing the appropriate switches. Such circuits effectively sum the individual measurements to provide a pick-up signal that reflects the pickup signal of a single sector antenna having an associated angle corresponding to the combined individual sector angles included in the group. Moreover, for each interval in a measurement cycle, a controller may add one adjacent sector antenna to the selected group, and/or eliminate one sector antenna from the group, such that all antennae that remain in the group are adjacent. For example, a measurement cycle may be defined as twelve consecutive time intervals. During each time interval three adjacent sector antennae may be selected, by closing the appropriate switches. The group selected may vary each interval, such that twelve different groups of three adjacent sectors antennae are utilized for each measurement. Additionally, a first group of adjacent sector antennae may be selected arbitrarily, but the subsequent groups may be selected such that the middle sector antenna of each of each subsequent group during any one time interval is adjacent to the middle sector antenna of the selected group during the previous time interval. One advantage of such a method is that the azimuthal resolution of the tool is increased by having a large number of small angled sector antennae, yet the strength of the pick-up signals obtained from measurement reflects that of much larger angled sector antennae.

For increased accuracy, the components and interconnecting transmission lines comprising each sub-circuit 464-467 shown in FIG. 4C are preferably selected to be matched. In particular, resistors R1-R4 454-457 are selected to be the same within a high degree of tolerance, for example 1%. Matched sub-circuits tend to provide essentially identical measurements for homogenous environments surrounding the measurement tool employing circuit 402.

Figure 4D:
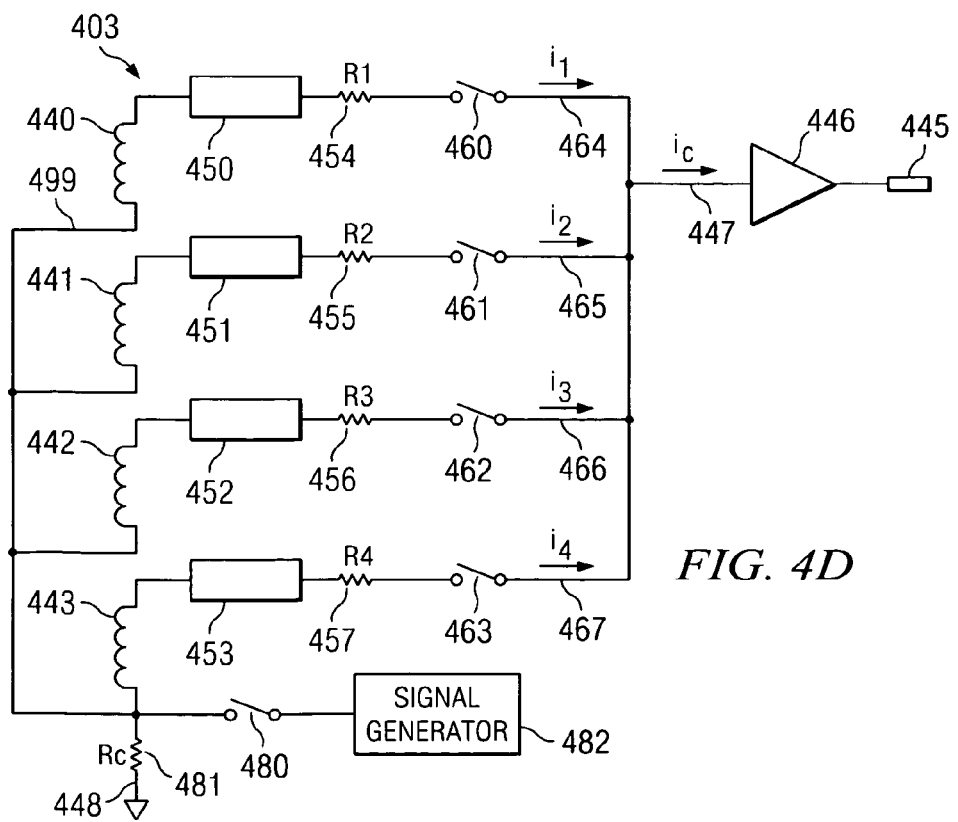
Figure 4E:
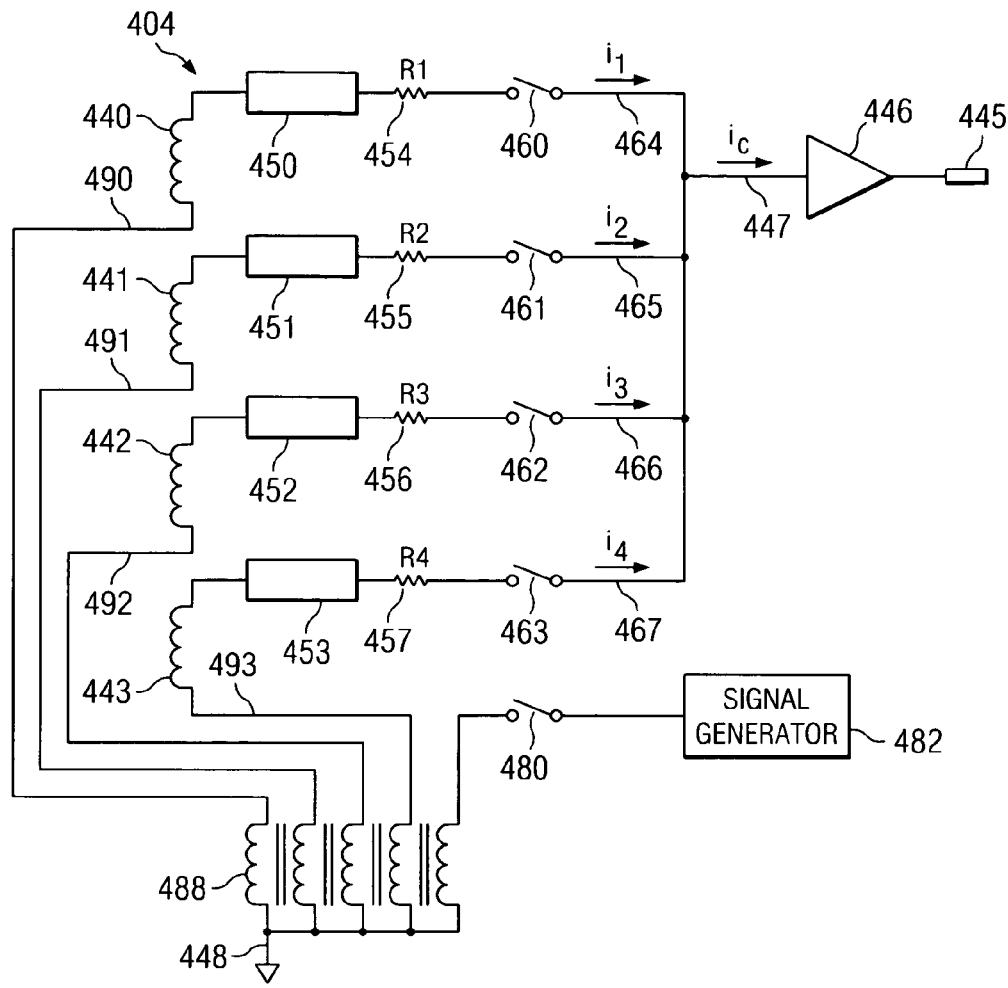

Turning now to FIGS. 4D and 4E, calibration circuits may be incorporated into circuit 402 (FIG. 4C). During normal operation, such calibration circuits 403 and 404 function similarly to circuit 402. Circuits 403 and 404 may be selected to enter a calibration mode in which signal generator 482 drives a calibration signal that is selected to simulate the response of each antenna 440-443 to a received electromagnetic wave. For example, the calibration signal may be sinusoidal, having the same frequency as used by a measurement tool to interrogate the surrounding formation. The signal may be, for example, a sum of two sinusoidal signals, or alternatively, a square wave with predominant frequency being the same as the interrogation frequency. Circuits 403 and 404 include a switch 480 that interconnects nodes 490-493 (FIG. 4E) and 499 (FIG. 4D) to calibration signal generator 482. Circuits 403 and 404 enable for nodes 490-493 and 499 to be electrically connected to an end of each sub-circuit 464-467, which, in circuit 402 (FIG. 4C), are connected to electrical ground 448. Circuit 404 (FIG. 4E) enables node 499 to be electrically connected to ground though a resistor Rc 481, which is preferably substantially smaller than resistors R1-R4 454-457. Node 499 is connected to the end of each sub-circuit 464-467. Circuit 403 provides a coupling transformer 488 through which nodes 490-493 are connected to ground. The respective turns of transformer 488 may be selected to step the calibration signal down such that it closely simulates the levels observed by preamplifier 446 during normal operation.

With continued reference to FIGS. 4D and 4E, a central controller (not shown) may select between normal operation mode and calibration mode by controlling switch 480. When switch 480 is closed, calibration mode is entered and the calibration signal generated by signal generator 482 is driven on to nodes 490-493, and 499. When switch 480 is open, circuits 403 and 404 function substantially identically to circuit 402 (FIG. 4C). One exemplary method for calibrating circuits 403 or 404 includes: (1) entering calibration mode by closing switch 480; (2) sequentially closing switches 460-463, during a plurality of predefined time intervals, thereby generating a simulated pick-up signal; (3) obtaining a plurality of measurements of the simulated pick-up signal, a single measurement being obtained during each of the predefined time intervals, each measurement including, for example, the amplitude and/or phase of the simulated pick-up signal; (4) comparing each measurement to an expected value; (5) deriving a plurality of calibration factors for adjusting each measurement to obtain the expected values; and (6) storing the plurality of calibration factors. During normal operation each measurement, may be adjusted based on the calibration factors to compensate for errors in measurements induced by minor mismatches in each sub circuit 464-467.

Calibration circuits 403 and 404 allow for the cross-coupling effect between sector antennae to be simulated, measured, and compensated for each time a measurement is obtained. During each of a plurality of predefined time intervals, a simulated pick-up signal may be induced through distinct sub-circuit 464-467 groups. Combination of two sub-circuits 464-467 may be selected during each time interval. The combined pick-up signal ic, may be compared to measurements obtained when each sub-circuit circuit 464-467 is selected individually to determine a calibration factor associated with each group that estimates the affects of cross-coupling. The calibration factor may be applied for each measurement obtained with the associated group. An alternative embodiment of a calibration circuit may provide for a calibration signal to be selectively applied to one sector antenna at a time, to excite each antenna with one of a plurality of selectable excitation frequencies. Such an alternative embodiment may provide for the other antennae to be individually selectable to measure the cross-coupling effect induced by the excited antenna. These values may be stored and applied during normal operation to compensate for the effects of cross coupling. Furthermore the alternative embodiment may provide for two or more frequency options for the excitation signal.

Exemplary receiver circuits may include a preamplifier that is advantageously located in close proximity (e.g., within about 8 inches) to the receiver antenna. Furthermore, a single preamplifier circuit may provide an interface for a plurality of sector antennae to communicate to a distantly located second receiver circuit through a single communications channel, such as the previously given example of a 4 to 8 foot coaxial cable. In summary, exemplary embodiments shown in FIGS. 4A through 4B and described earlier in this disclosure, provide suitable interconnection between a single preamplifier circuit and a plurality of sector antennae. Disclosed embodiments include a plurality of switches that are disposed to be controllable to select one of a plurality of measurement options, such as non-azimuthal measurements and a plurality of azimuthal measurements that are each associated with a different azimuthal direction.

In accordance with another aspect of this invention, a central controller may determine the state of various of a plurality of electrical switches through a plurality of transmission lines coupled to respective switches. Aspects of this invention provide the primary control function to be implemented in circuits distantly located from the plurality of sector antennae and preamplifier. For example, the primary control function may be located near the second receiver, so that the same processor system utilized to control the measurement tool and interpret measurement data may be advantageously utilized to determine the state of the switches. Furthermore, aspects of this invention provide for two-way communication over a single communications channel to provide for communication of analog measurement data as well as status and commands data.

Figure 5A:
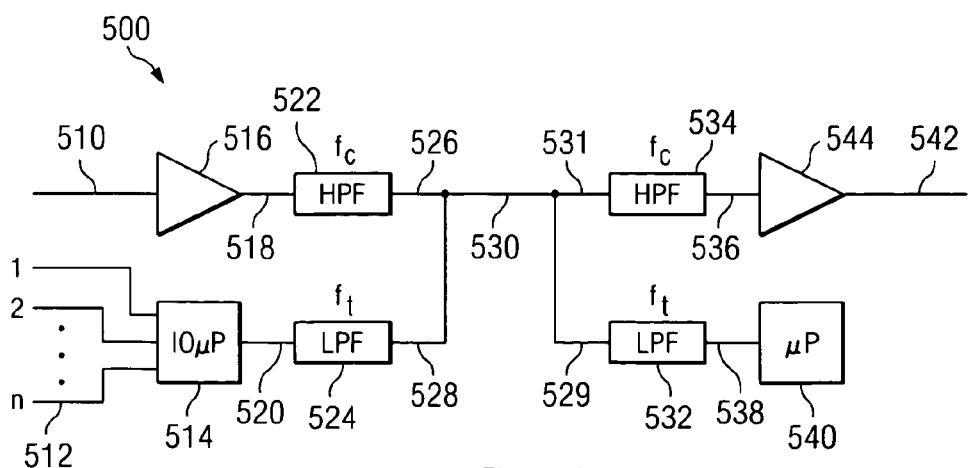
FIGS. 5A and 5B depict exemplary block diagrams useful for communicatively coupling controllers and stages of amplifiers through a channel according to embodiments of this invention.
Figure 5B:
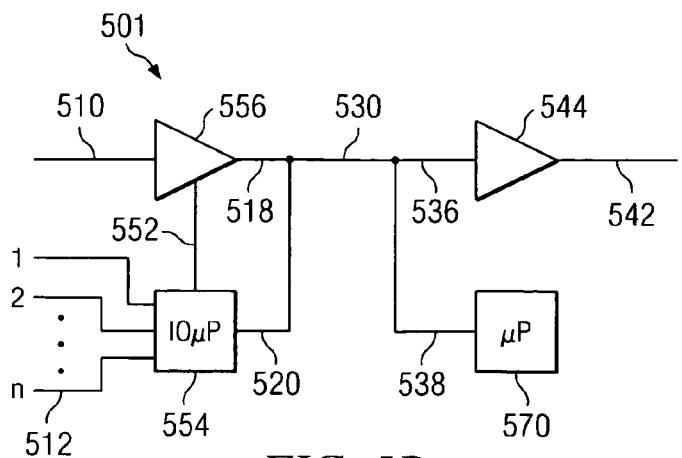

With reference now to FIGS. 5A and 5B, schematic block diagrams of alternative exemplary embodiments 500, 501 of this invention are shown. Local amplifiers 516 and 556 (shown on FIGS. 5A and 5B respectively) each receive a respective pick-up signal on an input 510 that indicates the relative amplitude and/or phase of selected frequency components of a received electromagnetic wave. An amplified version of the pick-up signal received on node 510 is driven on to output 518. Local amplifiers 516, 556 are each suitable to function as preamplifier 416, 426, 446 shown in FIGS. 4A through 4E. A distant amplifier 544 is disposed to selectively receive on input 536 an amplified version of the pick-up signal and provide another amplified version of the pick-up signal on output 542. A communications channel 530, such as a coax cable or a pair of conductive wires, electrically couples respective node 518 and node 536 for communicating the analog pick-up signal.

Embodiments 500, 501 further include a local controller 514, 554 (FIGS. 5A and 5B respectively) and a distant controller 540, 570 (FIGS. 5A and 5B respectively). The local controller 514, 554 is communicatively coupled through channel 530 to the respective distant controller 540, 570. The local controller 514, 554 may be implemented using an IO processor such as Texas Instruments PCF8574. Local controller 514, 554 includes an output register that drives a plurality of n output control signals 512, which select one of a plurality of configuration options. Configuration options may include a plurality of source options and/or operating modes. Output control signals 512 are suitable to electrically couple and control the state of each of the plurality of switches 417, 427, 460-463, 480 shown in FIGS. 4A through 4E for determining which sector antenna contributes to the pick-up signal received on input 510 and/or for selecting calibration/normal operation modes. The distant controller 540, 570 may include a processor, such as Microchip PIC16C73, which may, optionally, be communicatively linked to the surface to receive commands or send status and data to a drilling operator and may also receive and interpret measurement data. Distant controller 540, 570 may be adapted to selectively determine the source for each pick-up signal by determining the state of the switches and may be disposed to selectively send a command to the local controller 514, 554 instructing the it accordingly. The source of the pick-up signal may be determined based on a predefined measurement sequence, cycle, or program; dynamically received commands received from the drilling operator; and/or predefined triggers and the detection of triggering events. The distant controller 540, 570 is communicatively coupled to the local controller 514, 554 to receive commands therefrom and to set the state of the output control signals 512 based on the received commands.

Embodiment 500 shown on FIG. 5A includes a first and second high-pass-filter 522, 534 and a first and second low-pass-filter 524, 532. Embodiment 500 is suitable for concurrent communication of commands between the local 514 and distant 540 controller and analog data between the local 516 and distant 544 amplifiers. Communication between the local 516 and distant 544 amplifiers is at the frequency $f_c$, which may be, for example, the lowest interrogation frequency employed and thus the lowest frequency of the pick-up signal, such as 0.4 MHz. A pick-up signal received on node 518 is driven on to node 526 where it is combined with a signal driven by low-pass filter 532 or 524. High-pass filter 534 receives the combined signal on input 531 and approximates the pick-up signal on node 536 by filtering out the low frequency components. Concurrently, each of the low pass filters is disposed to detect an intra-controller communications signal on respective nodes 520, 538, from either the local 514 or distant 540 controller, and generate a low frequency version on respective nodes 528, 529, which combines with the analog signal on channel 530.

Embodiment 501 shown in FIG. 5B provides for a communication channel 530 to be alternatively utilized either by the local amplifier 556 (to communicate an analog pick-up signal to the distantly located amplifier 544) or for intra-controller communication between the local 514 and distant 540 controller. The local controller 554 further includes a register output 552 that is received by local amplifier 556. In addition, distant controller 570 selectively drives output 538 to send commands generally only when local amplifier output 518 is in a high-impedance state. Optionally, local controller 554 may selectively drive output 538 to send commands generally only when local amplifier output 518 is in a high-impedance state. Some embodiments may allow for bus conflicts to occur in certain situations where local controller 554 and distant controller 570 drive the communication channel 530 concurrently, or, alternatively, local controller 554 may only drive the communications channel 530 only when not driven by another source.

Another aspect of the present invention is a protocol that provides for intra-controller communications for dynamically determining measurement cycles, calibrating the instrument, and performing self-test and diagnostics. One embodiment of a protocol of the present invention provides for local controller 554 and local amplifier 556 to not drive the communications channel until directed to do so, to eliminate bus conflicts. The distant controller 540 initiates one of a plurality of command options, which are received and acted on by the local controller 554. Command options include a command to initiate a measurement. In response to the command, the local controller 554 determines the state of the plurality of n outputs 512 that control the respective switches to select the source of the measurement and set the state of output 552 to cause local amplifier 556 to drive communications channel 530 with the analog pick-up signal which is received by the distant amplifier 544. Optionally, the local and distant controller 554, 570 may include a timer for measuring time intervals. Preferably, each expected command response or measurement may have a predefined duration so that after sending each command, the distant controller output 538 enters a high-impedance state and waits for the command to be completed before driving communications channel 530. Alternative embodiments may provide for the local controller 554 to indicate the ends of a response or measurement by driving the communication channel 530 with a specific identifiable pattern. Alternative embodiments may configure the local controller 554 for detecting a measurement, such as a signal from a transmitter. The controller may also be configured to detect an active pick-up signal, and in response drive the communications channel 530 with a specific identifiable pattern, thereby alerting the distant controller 570 that data is about to be sent. In addition, parameters defining a measurement sequence or a plurality of predefined sequences may be dynamically communicated from distant controller 570 to local controller 554. This allows for lengthy measurement sequences to be executed without interruption by the distant controller 570. One advantage of allowing for dynamic modification of the parameters of each sequence is that the sequence may be selected to conform to tool rotation speed.

The time intervals that comprise a predefined measurement sequence may advantageously be selected based on the rate of rotation of the drill string. A measurement tool may include a rate of rotation measurement devices for tracking the rate of rotation of the drill string and may synchronize the duration of the various time intervals to coincide with the rate of rotation of the drill string. For example a measurement sequence may be predefined to take place in approximately the time to rotate once, or for the azimuthal directions associated with each measurement to roughly coincide with four stationary quadrants around the drill string.

Communication between the distant 570 and local controllers 554 provides for diagnostic and tests of the receiver system. For example, commands may include requests from the distant controller 570 to the local controller 554 to send an acknowledgement; to run and report the results of a self-test; enter an echo mode where each command sent by the distant controller is received and resent by the local controller; as well as specify a state for the controllable switches and request that the state be continued for either a specified duration or indefinitely until a stop command is issued. A stop command may be selected that may be detected by the local controller even if there is a bus conflict between the distant controller and the local amplifier.

Although the present invention and its advantages have been described in detail, it should be understood that various changes, substitutions and alternations can be made herein without departing from the spirit and scope of the invention as defined by the appended claims.

I claim:

1. A logging while drilling tool comprising:
   a tool body;
   a transmitter deployed on the tool body, the transmitter disposed to transmit electromagnetic energy into a subterranean formation;
   a receiver deployed on the tool body, the receiver being longitudinally spaced from the transmitter; and,
   at least one of the transmitter and the receiver including at least one sector antenna, the sector antenna including a length of antenna wire, the length of antenna wire including (i) an exposed portion forming an arc about a portion of a circumference of the tool body and (ii) a shielded portion.

2. The logging while drilling tool of claim 1, wherein the tool body and the arc are substantially coaxial.

3. The logging while drilling tool of claim 1, wherein the arc subtends a circular angle in the range from about 15 to about 345 degrees about the circumference of the tool body.

4. The logging while drilling tool of claim 1, wherein the arc subtends a circular angle of less than about 120 degrees about the circumference of the tool body.

5. The logging while drilling tool of claim 1, wherein the shielded portion comprises opposing ends of the length of antenna wire, the opposing ends being routed inside the tool body to a location that is substantially shielded from said transmitted electromagnetic energy.

6. The logging while drilling tool of claim 1, comprising a plurality of sector antennae, the plurality of sector antennae being electrically connected to one another.

7. The logging while drilling tool of claim 1, wherein:
   the transmitter comprises a loop antenna including an exposed wire portion, the exposed wire portion deployed about at least a portion of a circumference of the tool body; and
   the receiver comprises a plurality of sector antennae, each of the sector antennae including an exposed length of antenna wire, each of the exposed lengths forming a corresponding arc about a portion of the circumference of the tool body.

8. The logging while drilling tool of claim 1, wherein:
   the receiver comprises a plurality of said sector antennae; and
   each of the sector antennae is disposed to provide an electrical signal indicative of an electrical property of the formation proximate to the sector antenna.

9. The logging while drilling tool of claim 1, wherein at least one of the transmitter and the receiver comprises a plurality of said sector antennae, the plurality of sector antennae, in combination, extending around approximately one full circumference of the tool body without substantially overlapping one another.

10. The logging while drilling tool of claim 9, wherein:
    the receiver includes the plurality of said sector antennae;
    each of the plurality of sector antennae is disposed to provide an electrical signal indicative of an electrical property or the formation proximate to the sector antenna; and
    a sum of the electrical signals provides a non-azimuthally sensitive indication of the electrical property.

11. The logging while drilling tool of claim 1, comprising at least one pair of transmitters deployed about a pair of receivers, each of the receivers including a plurality of said sector antennae.

12. The logging while drilling tool of claim 1, wherein the exposed length of antenna wire is deployed in a circumferential recess formed in an outer surface of the tool body.

13. The logging while drilling tool of claim 1, further comprising a metallic shield deployed about the exposed length of antenna wire, the metallic shield including a plurality of spaced radial slots formed therein.

14. The logging while drilling tool of claim 1, wherein the sector antenna comprises a plurality of exposed lengths of antenna wire, the exposed lengths forming the arc about the portion of the circumference of the tool body.

15. The logging while drilling tool of claim 1, further comprising an azimuth sensor deployed on the tool body.

16. A logging while drilling tool comprising:
    a substantially cylindrical logging while drilling tool body;
    a transmitter deployed on the tool body, the transmitter disposed to transmit substantially non azimuthally focused electromagnetic energy into a subterranean formation;
    a receiver deployed on the tool body, the receiver being longitudinally spaced from the transmitter, the receiver including first and second sector antennae, each of the sector antennae including an exposed length of antenna wire deployed in a circumferential recess formed in an outer surface of the tool body, each of the exposed lengths forming a corresponding arc about a portion of a circumference of the tool body; and
    the first and second sector antennae, in combination, subtending a circular angle of about 360 degrees about the circumference of the tool body without substantially overlapping one another.

17. The logging while drilling tool of claim 16, wherein the first sector antenna subtends a circular angle of less than about 120 degrees about the circumference of the tool body.

18. The logging while drilling tool of claim 16, wherein opposing ends of each of the lengths of antenna wire are routed inside the tool body to locations that are substantially shielded from said transmitted electromagnetic energy.

19. The logging while drilling tool of claim 16, wherein the first and second sector antennae are electrically connected to one another.

20. The logging while drilling tool of claim 16, comprising at least one pair of transmitters, the transmitters being longitudinally spaced and deployed about a pair of longitudinally spaced receivers, each of the receivers including first and second sector antennae.

21. The logging while drilling tool of claim 16, wherein:

each of the sector antennae is disposed to provide an electrical signal indicative of an electrical property of the formation proximate to the sector antenna; and a sum of the electrical signals provides a non-azimuthally sensitive indication of the electrical property.

22. A logging while drilling tool comprising:

a substantially cylindrical logging while drilling tool body;

a transmitter deployed on the tool body, the transmitter disposed to transmit azimuthally focused electromagnetic energy into a subterranean formation;

a receiver deployed on the tool body, the receiver being longitudinally spaced from the transmitter;

the transmitter and the receiver each including a plurality of sector antennae, each of the sector antennae including an exposed length of antenna wire, each of the exposed lengths forming a corresponding arc about a portion of a circumference of the tool body; and each of the sector antennae in the receiver being disposed to provide an electrical signal indicative of an electrical property of the formation proximate to the sensor.

23. The logging while drilling tool of claim 22, wherein plurality of said transmitting sector antennae and the plurality of said receiving sector antennae are substantially azimuthally aligned.

24. The logging while drilling tool of claim 22, comprising at least one pair of longitudinally spaced transmitters deployed about a pair of longitudinally spaced receivers.

25. A logging while drilling tool comprising:

a tool body;

a transmitter deployed on the tool body, the transmitter disposed to transmit electromagnetic energy into a subterranean formation;

a receiver deployed on the tool body, the receiver being longitudinally spaced from the transmitter; and, at least one of the transmitter and the receiver including a plurality of sector antennae, each of the sector antennae including an exposed length of antenna wire, the exposed length forming an arc about a portion of a circumference of the tool body, the plurality of sector antennae being electrically connected to one another.

26. The logging while drilling tool of claim 25, wherein the plurality of sector antennae, in combination, extend approximately around a full circumference of the tool body without substantially overlapping one another.

27. The logging while drilling tool of claim 26, wherein:

the receiver includes the plurality of said sector antennae;

each of the plurality of sector antennae is disposed to provide an electrical signal indicative of an electrical property of the formation proximate to the sector antenna; and a sum of the electrical signals provides a non-azimuthally sensitive indication of the electrical property.

* * * * *